(12) United States Patent
Jensen

(10) Patent No.: US 12,422,843 B2
(45) Date of Patent: Sep. 23, 2025

(54) MULTI-MODE REMOTE IDENTIFICATION (RID) SYSTEM FOR UNMANNED AIRCRAFT SYSTEMS (UAS)

(71) Applicant: RUMFERT, LLC, Omaha, NE (US)

(72) Inventor: David Dale Jensen, Omaha, NE (US)

(73) Assignee: RUMFERT, LLC, Omaha, NE (US)

( * ) Notice: Subject to any disclaimer, the term of this patent is extended or adjusted under 35 U.S.C. 154(b) by 534 days.

(21) Appl. No.: 17/565,121

(22) Filed: Dec. 29, 2021

(65) Prior Publication Data

US 2022/0291677 A1    Sep. 15, 2022

Related U.S. Application Data

(60) Provisional application No. 63/234,131, filed on Aug. 17, 2021, provisional application No. 63/173,100, filed on Apr. 9, 2021, provisional application No. 63/145,357, filed on Feb. 3, 2021, provisional application No. 63/131,874, filed on Dec. 30, 2020.

(51) Int. Cl.
*G05D 1/00* (2024.01)
*B64U 10/14* (2023.01)
*B64U 101/20* (2023.01)
*B64U 101/30* (2023.01)

(52) U.S. Cl.
CPC .......... *G05D 1/0022* (2013.01); *B64U 10/14* (2023.01); *B64U 2101/20* (2023.01); *B64U 2101/30* (2023.01); *B64U 2201/20* (2023.01)

(58) Field of Classification Search
CPC ............ B60W 40/02; B60W 60/0015; B60W 2554/20; B60W 60/001; G01C 21/28; G01C 21/3658; G01C 21/3407
See application file for complete search history.

(56) References Cited

U.S. PATENT DOCUMENTS

| 6,064,335 A | 5/2000 | Eschenbach |
| 6,124,825 A | 9/2000 | Eschenbach |

(Continued)

OTHER PUBLICATIONS

U.S. Appl. No. 15/905,340, "Direct-Broadcast Remote Identification (RID) Device for Unmanned Aircraft Systems (UAS)"; applicant: Uavionix Corporation; filed Feb. 26, 2018.

(Continued)

*Primary Examiner* — Anne Marie Antonucci
*Assistant Examiner* — Jingli Wang

(57) ABSTRACT

The invention discloses a system and method of monitoring of unmanned aircraft systems (UAS) operating in the national airspace system (NAS). The multi-mode remote identification system ('remote ID') comprises an airborne sensor system having a multi-mode communication function adapted to remotely communicate the remote identification data of the unmanned aircraft system (UAS) to interested parties on the ground. The system includes the ability to communicate the UAS data using means compatible with smart phones or other portable personal computing devices for example using WiFi or Bluetooth communications. The system also discloses a means for communicating the UAS data over greater distances using V/UHF communication techniques and then relaying the data to end users using consumer compatible communication protocols such as WiFi and Bluetooth.

10 Claims, 18 Drawing Sheets

(56) References Cited

U.S. PATENT DOCUMENTS

| | | | |
|---|---|---|---|
| 8,886,459 | B2 | 11/2014 | Stefani et al. |
| 8,903,568 | B1 | 12/2014 | Wang et al. |
| 8,924,069 | B1 | 12/2014 | Kaneshige |
| 9,008,869 | B2 | 4/2015 | Allen et al. |
| 9,028,312 | B1 | 5/2015 | Wei |
| 9,105,184 | B2 | 8/2015 | Stefani et al. |
| 9,274,521 | B1 | 3/2016 | Stefani et al. |
| 9,466,216 | B2 | 10/2016 | Stefani et al. |
| 9,545,995 | B1 | 1/2017 | Chau et al. |
| 9,588,516 | B1 | 3/2017 | Gurel |
| 9,650,155 | B2 | 5/2017 | Wang et al. |
| 9,652,904 | B2 | 5/2017 | Shi et al. |
| 9,663,227 | B1 | 5/2017 | Lema et al. |
| 9,696,725 | B2 | 7/2017 | Wang |
| 9,769,617 | B2 | 9/2017 | Shur et al. |
| 9,990,854 | B1 | 6/2018 | Elmasry et al. |
| 10,054,941 | B1 | 8/2018 | Beard |
| 10,114,756 | B2 | 10/2018 | Koob et al. |
| 10,156,627 | B2 | 12/2018 | Beard |
| 10,401,166 | B2 | 9/2019 | Jensen |
| 10,663,597 | B1 | 5/2020 | Dormiani |
| 10,733,894 | B1* | 8/2020 | Beard .................. G01C 21/20 |
| 10,736,154 | B2 | 8/2020 | Jensen et al. |
| 10,825,345 | B2 | 11/2020 | Sugahara |
| 2006/0138277 | A1 | 6/2006 | Franceschini |
| 2007/0244608 | A1 | 10/2007 | Rath |
| 2014/0297067 | A1 | 10/2014 | Malay |
| 2014/0316616 | A1 | 10/2014 | Kugelmass |
| 2015/0179066 | A1* | 6/2015 | Rider ..................... G08G 1/04 |
| | | | 701/31.5 |
| 2015/0379874 | A1 | 12/2015 | Ubhi |
| 2016/0117853 | A1 | 4/2016 | Zhong |
| 2016/0214715 | A1 | 7/2016 | Meffert |
| 2016/0363447 | A1 | 12/2016 | Hayes |
| 2017/0127245 | A1 | 5/2017 | Adkins |
| 2017/0285627 | A1 | 10/2017 | Feldmann et al. |
| 2017/0374520 | A1 | 12/2017 | Shur et al. |
| 2018/0046062 | A1 | 2/2018 | Fisher et al. |
| 2018/0046187 | A1 | 2/2018 | Martirosyan |
| 2018/0120829 | A1 | 5/2018 | Price |
| 2018/0162527 | A1 | 6/2018 | Hupp |
| 2018/0173247 | A1 | 6/2018 | Ratti |
| 2018/0218214 | A1 | 8/2018 | Pestun |
| 2018/0225230 | A1 | 8/2018 | Litichever et al. |
| 2018/0260626 | A1 | 9/2018 | Pestun et al. |
| 2018/0275654 | A1 | 9/2018 | Merz et al. |
| 2018/0359792 | A1* | 12/2018 | Jensen .................. G06F 3/0482 |
| 2019/0172357 | A1 | 6/2019 | Meuleman et al. |
| 2019/0204824 | A1 | 7/2019 | Micros |
| 2020/0312159 | A1* | 10/2020 | Hegranes ............ H04B 7/18506 |
| 2020/0363199 | A1* | 11/2020 | Jensen ..................... G01C 5/06 |
| 2020/0410874 | A1 | 12/2020 | Jensen |
| 2021/0343154 | A1* | 11/2021 | Faccin ................. G08G 5/0069 |

OTHER PUBLICATIONS

FAA Declaration of Compliance listing. Up to date listing of UAVs/broadcast modules with approved Declarations of Compliance. https://uasdoc.faa.gov/listDocs, 2023.

BlueMark db201, db 121pcb, db121, and db120 Remote ID broadcast modules, FAA Declaration of Compliance RID000000016 and RID000000058; https://dronescout.co/#products; https://dronescout.co/product/dronebeacon-mavlink-db201-transponder/ (db201 product page); https://dronescout.co/product/dronebeacon-db121pcb/ (db121pcb product page); https://dronescout.co/product/dronebeacon-db 121/ (db121 product page); https://dronescout.co/ 2022 product/dronebeacon-db120/ (db 120 product page), 2022.

Dronetag Mini, Beacon, and DRI Remote ID broadcast modules, FAA declaration of Compliance RID000000025and RID000000045; https://dronetag.cz/; https://dronetag.cz/products/mini/ (mini product page); https://dronetag.cz/products/beacon/ (Beacon product page); https://dronetag.cz/products/dri/ (DRI product page), 2023.

Zephyr Systems Module 100 Beacon Remote ID broadcast modules, FAA declaration of Compliance RID000000032; https://zephyrsys.com/product/remote-id-module/, 2023.

AgEagle (sense Fly) Remote ID broadcast modules, FAA declaration of Compliance RID000000056; https://ageagle.com/drones/ebee-x/, 2023.

Drone Defence AeroPing Remote ID broadcast modules, FAA declaration of Compliance RID000000063; https://www.dronedefence.co.uk/aeroping/, 2023.

Federal Aviation Administration, Notice of Proposed Rule, Remote Identification of Unmanned Aircraft Systems, RIN 2120-AL31; Posted Dec. 31, 2019; https://www.regulations.gov/document?D=FAA-2019-1100-0001.

Experimental Aircraft Association comments to FAA proposed rule on Remote Identification of Unmanned Aircraft Systems, Dated Mar. 2, 2020; https://eaa.org/-/media/Files/EAA/Advocacy/03-03-2020-RemoteIDcomments.

Small UAV Coalition comments on FAA proposed rule on Remote Identification of Unmanned Aircraft Systems, Dated Mar. 2, 2020; https://secureservercdn.net/198.71.233.179/4z7.785.myftpupload.com/wp-content/uploads/2020/03/Comments-of-Small-UAV-Coalition-on-remote-ID-NPRM-030220-final.pdf.

Uavionix Corporation, Concepts for Remote Identification, Mar. 22, 2017; https://uavionix.com/downloads/whitepapers/uavionix-remote-identification-white-paper.pdf.

Uavionix Corporation, tailBeaconTM TSO User and Installation Guide; UAV-1002185-001 1 Rev C; Dec. 2, 2019; sctn 10 pp. 30-35; https://uavionix.com/downloads/tailbeacon/tailBeacon-TSO-User-and-Installation-Guide-UAV-1002185-001.pdf.

Uas Identification and Tracking (UAS ID) Avation Rukemaking Committee (ARC); ARC Recommendations Final Report; Sep. 30, 2017; https://www.faa.gov/regulations_policies/rulemaking/committees/documents/media/UAS%20ID%20ARC%20Final%20Report%20with%20Appendices.pdf.

YouTube Video, NUAIR; https://www.youtube.com/watch?v=1hxqWVXaEaM&feature=youtu.be, 2019.

Kittyhawk.io, Remote ID & Commercial Drones, White Paper, https://kittyhawk.io/resources/Remote-ID-White-Paper.pdf?dl=1, 2019.

DJI, "What's in a Name?" A Call for a Balanced Remote Identification Approach, DJI White Paper, Mar. 2017, https://www.dropbox.com/s/v4lkyr2kdp8ukvx/DJI%20Remote%20Identification%20Whitepaper%203-22-17.pdf?dl=0.

Uavionix, "Why Bluetooth is a Bad Idea for Drone Remote Identification", Oct. 7, 2019, https://uavionix.com/drone-remote-identification/.

Uavionix, Remote Identification—The Next Big Hurdle for Drone Regulations; Mar. 7, 2017, https://uavionix.com/remote-identification-the-next-big-hurdle-for-drone-regulations/.

Unmanned Aircraft Systems (UAS) Registration Task Force (RTF) Aviation Rulemaking Committee (ARC) Task Force Recommendations Final Report Nov. 21, 2015; https://www.faa.gov/regulations_policies/rulemaking/committees/documents/media/UASRTFARC-102015.pdf.

Micro Inmanned Aircraft Systems Aviation Rulemaking Committee (ARC) ARC Recommendations Final Report Apr. 1, 2016; https://www.faa.gov/uas/resources/policy_library/media/Micro-UAS-ARC-FINAL-Report.pdf.

Amit Ganjoo, Drone Registration and Remote ID: How do we handle it?, Sep. 25, 2017, https://www.linkedin.com/pulse/drone-registration-remote-id-how-do-we-handle-amit-ganjoo?articleId=6315212759638249472#comments-6315212759638249472&trk=public_profile_article_view.

15_Trackimo Advertisement. Trackimo 3G GPS Tracker Wi-Fi Bluetooth with Drone attachment kit, 2018, https://store.trackimo.com/products/3g-trackimo-drone-gps-tracker-attachment-kit.

16_IDS_6_13_17_C1_Eagle_Tree_Systems_LLC_-_Altimeter_MicroSensor_V4 Eagle Tree Systems, LLC—Altimeter MicroSensor V4 Company product web site: http://www.eagletreesystems.com/index.php?route=product/20.1.1 product&path=64&product_id=60 Product manual: http://www.eagletreesystems.com/Manuals/altimeter-v4.pdf, 2011.

17_IDS_6_13_17_C2-Parrot_-_Navigation_board Parrot—Navigation board https://www.dollarhobbyz.com/products/parrot-

(56) References Cited

OTHER PUBLICATIONS ar-drone-2-0-quadcopter-navigation-board?variant=10907414401&gclid=COO7s_e2mNMCFdK6wAodZ0QKVw, 2014.
18_IDS_6_13_17_C3_Hobby_King_Altimeter_Bluetooth_Adapter Hobby King Altimeter Bluetooth Adapter Company web site: https://hobbyking.com/en_us/hobbykingr-tm-altimeter-bluetooth-adapter-for-wireless-android-app.html?store=en_us 2013 Manual site: https://hobbyking.com/media/file/720875413X365809X2.pdf, 2013.
19_IDS_6_13_17_C4_Altimeter ThreeUserGuide 19_IDS_6_13_17_C4_JollyLogicAltimeterOne-Gen2-V4web 19_IDS_6_13_17_C4_JollyLogicAltimeterTwo-Gen2-V4web Jolly Logic products—Altimeter one, Altimeter two, Altimeter three Company site: https://www.jollylogic.com/, Jan. 19, 2015; Feb. 19, 2024; Mar. 19, 2024.
20_IDS_6_13_17_C5_SpecSheets-LeddarOne-290517-web Leddar Tech product—Leddar One (optical IR sensor) Company site: http://leddartech.com/ Product site: http://leddartech.com/modules/leddarone/, 2017.
21_IDS_6_13_17_C6_002246_ALTIMETER Estes—Model Rocket Altimeter 2013 Company site:http://www.estesrockets.com/ Product site: http://www.estesrockets.com/rockets/accessories/002246-estesr-altimeter, 2013.
22_IDS_6_13_17_C7_The_Ultimate_Tiny_Altimeter_Hackaday Hobbyist altimeter: http://hackaday.com/2014/06/20/the-ultimate-tiny-altimeter/?2014 utm_source=feedburner&utm_medium=feed&utm_campaign=Feed%3A+hackaday%2FLgoM+%28Hack+a+Day%29, 2014.
23_IDS_7_11_18_C1_Bluetooth_Open_Altimeter_website 2014 Bluetooth Open Altimeter—Web site: http://www.bluetoothopenaltimeter.com/, 2014.
24_IDS_7_11_18_C2_BTOA_User_Guide 2014 Bluetooth Open Altimeter—User's Guide, 2014.
25_IDS_7_11_18_C3_openaltimeter_home Open Altimeter—Website (Home page) http://openaltimeter.org/index.html, 2010.
26_IDS_7_11_18_C4_openaltimeter_hardware Open Altimeter—Website (Hardware page) http:/openaltimeter.org/hardware.html, 2010.
27_IDS_7_11_18_C5_openaltimeter_instructions Open Altimeter—Website (Instructions page) http://openaltimeter.org/instructions.html, 2010.
28_IDS_7_11_18_C6_Aircraft_Telemetry_Altimeter_SPMA9575 Spektrum SPMA9575 Aircraft Telemetry Altimeter—Web page https://www.spektrumrc.com/Products/Default.aspx? ProdID=SPMA9575, 2005.
29_IDS_7_11_18_C7_AR9320T_9CH_Telemetry_RX Spektrum AR9320T Telemetry RX—Web page https://www.spektrumrc.com/Products/Default.aspx?ProdID=SPMAR9320T, 2018.
30_IDS_7_11_18_C8_Aircraft_Telemetry_Variometer_Sensor_SPMA9589 Spektrum SPMA9589 Aircraft Telemetry Variometer Sensor—Web page https://www.spektrumrc.com/Products/Default.aspx?ProdID=SPMA9589, 2018.
31_IDS_7_21_17_C1_CoPilot3InstructionsVer1_3 Public Missiles Ltd Co-pilot V3 Altimeter Web site: https://publicmissiles.com/product/electronics Manual: https://publicmissiles.com/secure/images/CoPilot3InstructionsVer1_3.pdf, 2014.
32_IDS_7_21_17_C2_FireFly_manual 32_IDS_7_21_17_C2_Pnut_manual 32_IDS_7_21_17_C2_StratoLogger_manual 32_IDS_7_21_17_C2_StratoLoggerCF_manual PerfectFlite altimeters: http://www.perfectflite.com/Firefly.html, Jan. 31, 2024; Feb. 31, 2011; Mar. 31, 2011; Apr. 31, 2014.
33_IDS_7_21_17_C3_MARSA54L_Flight_Computer_User_V1_0 Marsa Systems Marsa54 http://www.marsasystems.com/index.php/products/marsa54lhd, 2014.
34_IDS_7_21_17_C4_RRC3_User_Manual_v1_60 Missile Works RRC3 http://www.missileworks.com/rrc3/ User manual http://www.missileworks.com/app/download/965482691/RRC3+User+Manual+v1.60.pdf, 2003.
35_IDS_8_1_17_C1_Pro_Glide_Flight_and_Boat_Seagull_and_Data_Recorder_Instruction_Manual Eagle Tree Systems, LLC Seagull Wireless Dashboard Flight System Manual: http://www.eagletreesystems.com/Manuals/Pro,%20Glide,%20Flight%20and%20Boat%20Seagull%20and%20Data%20Recorder%20Instruction%20Manual.pdf, 2003.
36_IDS_8_1_17_C1_Seagull_Wireless_Dashboard_web_site Eagle Tree Systems, LLC Seagull Wireless Dashboard Flight System Web site: http://www.eagletreesystems.com/index.php?route=product/product&path=63_70&product_id=90, 2013.
DJI—Drones with integrated navigation boards & altimeter function Company site: http://www.dji.com/ Product manual: https://dl.djicdn.com/downloads/phantom_4/20170327/Phantom+4+User+Manual+v1.4.pdf, 2017.

\* cited by examiner

MULTI-MODE REMOTE IDENTIFICATION (RID) SYSTEM FOR UNMANNED AIRCRAFT SYSTEMS (UAS)

CROSS REFERENCE TO RELATED APPLICATIONS

This application claims benefit of U.S. provisional applications Ser. Nos. 63/131,874 filed Dec. 30, 2020; 63/145357 filed Feb. 3, 2021; 63/173100 filed Apr. 9, 2021; and 63/234131 filed Aug. 17, 2021, all of which are herein incorporated by reference in their entirety. This application references information disclosed U.S. provisional application Ser. Nos. 62/868,905 filed Jun. 29, 2019; 62/990,660 filed Mar. 17, 2020; and non-provisional application Ser. No. 16/914,315 filed Jun. 27, 2020, all of which are herein incorporated by reference in their entirety. This application also references information disclosed in U.S. patent applications Ser. No. 15/995,314 filed Jun. 1, 2018 (now U.S. Pat. No. 10,736,154), and 16/983,633 filed Aug. 3, 2020, both of which are continuation-in-part applications of U.S. patent application Ser. No. 15/622,028 filed Jun. 13, 2017 (now U.S. Pat. No. 10,401,166), all of which are incorporated herein by reference in their entirety.

TECHNICAL FIELD

The subject matter of the invention relates generally to the monitoring of unmanned aircraft (UA) operating in the national airspace system (NAS). More specifically, it relates to systems and methods of remotely identifying such aircraft to interested constituencies such as the pilot, law enforcement, public safety, and members of the public. Each of these constituencies has responsibilities and interests which may overlap but may also be different. In particular, it gives parties on the ground the ability to identify the operator of the vehicle, its current position, and the point at which the aircraft took off. This gives law enforcement or national security personnel the means to check the identity of the owner/operator and, if necessary, to physically confront him while remote operations are underway. It also gives the general public the ability to identify the UAS operator indirectly thru the UAS serial number broadcast from the UAS in a process similar to how a license plate may be used to identify the operator of an automobile. The pilot's responsibility is to verify the proper operation of the remote identification broadcast system throughout the UAS flight. Configurability of the system allows it to be tailored to different modes/missions.

BACKGROUND OF THE INVENTION

Although unmanned aircraft (UA) have been around for many years, advances in technology, introduction of quad rotors, and reductions in size and cost, have resulted in an escalation in recreational use and have begun to spur their exploitation for various commercial purposes. Exemplary commercial uses include package delivery, real estate surveys, and photography. Additionally, news organizations, law enforcement, commercial operators, and Department of Defense operations utilize UAS for various news and surveillance purposes.

With increasing numbers and uses of unmanned aircraft has come the need to better integrate these aircraft into the National Airspace System (NAS). In the United States, the Federal Aviation Administration (FAA) has been tasked with accomplishing this integration. As part of this effort, the FAA has promulgated various rules with one emphasis being the ability to remotely identify the UA during flight. This identification requirement is known as remote identification or remote ID (RID).

In the United States, the Federal Aviation Administration (FAA) has mandated the use of remote identification technology for the vast majority of unmanned aircraft being operated in areas not designated an FAA recognized identification area (FRIA). The FAA has not mandated any specific technology. WiFi and V/UHF are two communications protocols particularly well suited for this purpose. WiFi has the obvious advantage that nearly everyone has a WiFi enabled device on their person at almost all times: if not a smartphone, then a laptop or tablet computer. Thus, pilots, members of the public, and even public safety officers would be readily able to receive and display UAS data broadcast using WiFi technology, so long as it is within range. Additionally, WiFi is a well understood technology. Between widespread availability of receivers and ease of use, WiFi would certainly promote the FAA's goal of making the unmanned aircraft identification widely available to the general public as well as law enforcement and national security personnel. One disadvantage of WiFi is its relatively limited range.

The V/UHF communication protocol offers potentially greater range but with the trade-off that compatible receivers are less ubiquitous than WiFi receivers. However a simple interface may be provided, allowing the V/UHF receiver to be easily integrated, either physically (e.g. plug and play), or wirelessly (e.g. via a radio relay function), with a display device such as a smartphone or other computing/display device allowing the long range benefits of V/UHF to be combined with the convenience of displaying the received RID data on a ubiquitous smartphone or other device. In one exemplary implementation, the long range V/UHF signal is translated to a WiFi broadcast for wireless relay to a smartphone for display. The V/UHF receiver might also be paired with a display device such as a liquid crystal display (LCD), to create a stand-alone receiver/display for receiving and displaying the broadcast remote ID data. Still further, the V/UHF receiver might maintain a wired, serial connection to a display for display of the RID data (RIDD).

Of course the communication modes are not mutually exclusive and the UAS RID broadcast module transmitting device might be constructed using configurable components, allowing it to utilize both WiFi and V/UHF RF communication technology. Such a multi-mode remote ID broadcast device would be capable of both shorter range, but more widely receivable, signals for the general public (e.g. WiFi), and longer range V/UHF signals (e.g. LoRa®, LoRaWAN®) for the UAS pilot and public safety constituencies. Furthermore, various conversion or relay functions might be utilized, allowing, for example, the RID data to be received using a longer range V/UHF signal and then relayed to a WiFi compatible display device. In this specification, the term "RF" may be used to refer to the V/UHF function or mode though it is acknowledged that WiFi is also a 'radio frequency' signal.

As alluded to, the FAA rule mandating implementation of Remote ID recognizes three primary constituencies for the remote identification data: the pilot/operator, law enforcement/public safety, and the general public. Each of these constituencies has an interest in the remote identification data and/or regulatory responsibility under provisions of the rule. An additional constituency not recognized in the Remote ID rule is the manned aircraft pilot, especially those flying at very low altitudes, wishing to avoid unmanned vehicles.

SUMMARY OF THE INVENTION

The present invention is directed to a modular multi-mode remote identification broadcast system (RBS) for broadcast of certain unmanned aircraft information during flight. 'Multi-mode' refers to the fact that several communication modes may be utilized. The invention may be integrated by the original equipment manufacturer as part of the baseline UAS design or may be installed as an aftermarket broadcast module. The invention may include both transmitting and receiving/display components.

There are several constituencies interested in UAS remote identification data. The pilot is required by regulation to monitor the operation of the remote identification equipment to ensure its proper operation throughout the flight. Public safety or other governmental agencies may need the remote identification data to investigate public safety or national security concerns prompted by the UAS flight. The public may need the remote identification data to allay fears of privacy invasion or to report unsafe or obnoxious UAS operations to public safety officials. The flexibility of the configurable, modular, multi-mode design allows a single device to service these various interested constituencies.

The Remote ID broadcast system (RBS) of the present invention contemplates at least three possible operating modes: WiFi direct broadcast, RF direct (V/UHF), and radio relay (e.g. WiFi relay, cellular relay, etc.). (In this specification the term "RF" may be used to refer to the V/UHF function or mode (e.g. LoRa®, LoRaWAN®)) The RBS is designed using a modular concept so that units may be configured for a limited or full set of communication modes. The WiFi direct mode allows the greatest public access to the UAS data by broadcasting using a WiFi signal receivable by any WiFi enabled device such as smartphone, smart watch, laptop, tablet computer and the like. The V/UHF broadcast RF direct mode allows the remote identification data to be transmitted over a longer range using a V/UHF receiver to receive the data. A display device such as a liquid crystal display (LCD) may be integrated with the receiver, or the receiver may utilize a wired connection to an external standalone device such as a smartphone (e.g. plug and play). Alternatively, a standalone receiver/display may be wirelessly (e.g. WiFi, cellular, etc.) connected to the V/UHF receiver in a 'relay mode.' In one exemplary embodiment, a WiFi relay combines the benefits of the longer range transmission distance of the V/UHF signal with the widespread availability of WiFi enabled devices for display of the remote identification data.

In addition to the transmission of the remote identification data for textual display, the data may also be used in conjunction with a mapping application such as GOOGLE MAPS to geographically plot the position of the UAS. The system may also include a storage medium for storing the UAS data. The system may further include audio functionality to alert the pilot of any abnormal conditions.

DETAILED DESCRIPTION

Figure 1A:
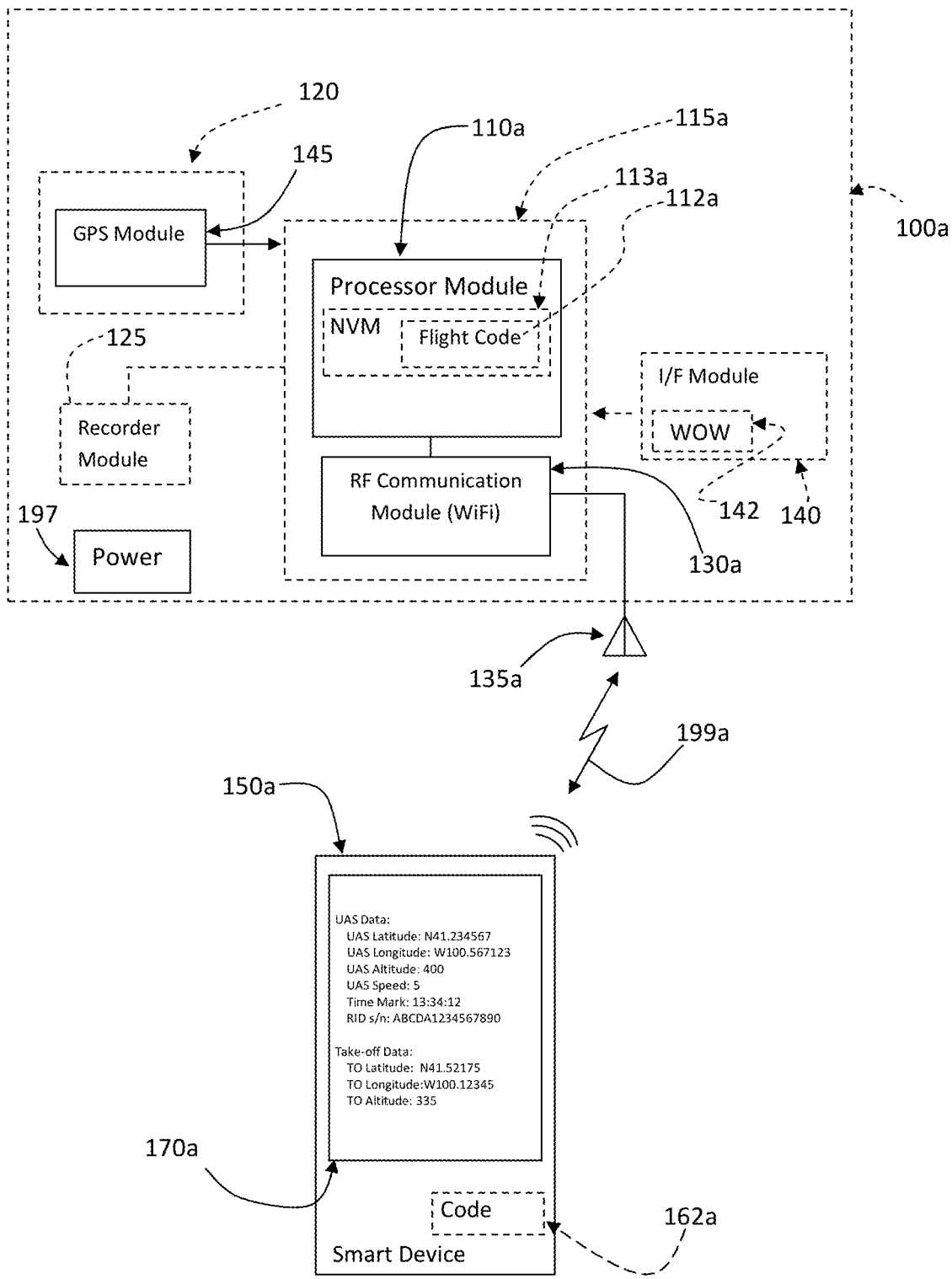
FIGS. 1a-1d are block diagrams of the multi-mode remote broadcast system, illustrating the various communication operating modes of the invention.

The multi-mode remote ID broadcast system (RBS) gathers UAS flight data during the conduct of a flight, and periodically transmits (i.e. broadcasts) this data to interested parties, sometimes referred to herein as constituencies. As described above, the purpose behind the FAA's remote ID mandate is to provide a means for these constituencies to identify an unmanned vehicle. Broadly, the constituencies may be identified as the general public, the UA pilot, and public safety officials. Each of these may have a different interest in the UA and may have differing distances from the UA.

Generally speaking, the interested public is likely to be the most proximate to the UA at the time of observance. This is due primarily to physical considerations. Most UAs are small and thus may only be (visually) observed within small distances. Similarly, the audio footprint is small but more attention getting than its visual footprint. In other words, UAs may often be heard before being seen. The UA pilot is likely the next closest to the UA during flight. It is still an FAA requirement that the pilot maintain visual contact with the UA while in flight. Thus, the pilot may be located further from the UA than the interested public but still may be relatively close ('interested public' is used to mean members of the public who are aware of the UAS). Public safety officials may be in the vicinity of the public but may also be more remote, at least initially. In a real world scenario encountered during the development of the invention, a photo drone was operated beyond the outfield bleachers of a ballpark. Several of the patrons in the outfield bleachers became aware of the UA noise and turned to observe the UA behind and above them. The vast majority of spectators never appeared to acknowledge the UA or the noise. The pilot was operating the UA from a location in the parking lot. There were public safety officials located throughout the ball park and surrounding environs as would be expected for a sporting event. The distances in this scenario then were 50-100 feet for the public, 100-150 feet for the pilot, and 50-1000 feet for public safety. In another occurrence, a photo UA was observed to fly to and hover over the middle of the field—a distance of approximately 300 feet from where it was observed. A multi-mode system provides the flexibility to serve these diverse distances and constituencies.

The multi-mode Remote ID broadcast system (RBS) of the present invention discloses several communication modes: WiFi direct broadcast, RF direct (V/UHF), radio relay (e.g. WiFi relay). The communication modes are illustrated in FIGS. 1a-1d. The different modes relate not only to different transmission ranges, but also to the equipment required for receiving and displaying the UAS flight data. For example, WiFi direct generally has a range more limited than V/UHF, but requires no special receiver (most everyone has a WiFi enabled receiver in their pocket (i.e. smartphone)), whereas V/UHF requires a dedicated receiver.

The RBS is designed using a modular concept so that units may be configured for a limited or full set of communication modes. In one embodiment, each mode may be activated or deactivated via software, as needed. The modes are largely independent of each other and may be operated singularly or in combination with each other except that the radio relay mode relies on the RID data being received, and relayed, via the V/UHF (RF) receiver.

As mentioned, the communication modes of the present invention include: WiFi direct, RF direct (V/UHF), and radio relay (e.g. WiFi relay). In the WiFi direct mode (FIG. 1a), the UAS remote identification data (RIDD) is broadcast directly from the airborne sensor suite/communication module (SSCM) 100a to a WiFi enabled remote receiver/display device (RRDD) 150a via the WiFi communication protocol 199a. In an exemplary implementation, the SSCM 100a, comprising a WiFi communication module 130a, performs the function of the network server while the remote receiver/display 150a acts as the client. As is well understood by those familiar with WiFi networking, there are many ways to implement WiFi communication. In exemplary implementations of the WiFi direct mode of the present invention, the airborne transmitter (server) (SSCM 100a) functions in Access Point mode ('softAP') with the remote receiver 150a acting as a client.

In the RF direct mode (FIG. 1B), communication module 130b of SSCM 100b includes a V/UHF transceiver 130b which broadcasts the remote ID data to a remote receiver/relay system (RRRS) 180b via an RF datalink 199b. The remote receiver/relay 180b includes a downlink module 157b for receiving the V/UHF broadcast 199b from the SSCM 100b and a display means 190 for displaying the received data. In one exemplary embodiment, the display is a liquid crystal display (LCD) or similar display 190. In another exemplary embodiment, the remote receiver/relay 180b includes an interface 165b, allowing the received data to be output to a display device 150b such as over a serial interface.

The radio relay mode (FIG. 1c) utilizes the V/UHF datalink 199b of the RF direct mode, but the remote receiver/relay 180c further includes a transceiver (radio relay module) 159c to relay the received V/UHF remote ID data via a wireless connection 155c to a wireless receiver/display 150c. As mentioned, in an exemplary implementation, the wireless relay connection 155c is made using WiFi technology and is referred to as 'WiFi relay.' This allows the relay RIDD to be received/displayed using the ubiquitous smartphone.

As mentioned, the different communication modes are not mutually exclusive and can be implemented simultaneously. FIG. 1d illustrates a 'full-up' implementation of all three modes operating simultaneously.

In an exemplary implementation, the RF modes (RF direct and radio relay) are implemented with Long-Range radios utilizing LoRa® spread spectrum modulation technology, functioning in packet mode. In this implementation, the airborne broadcast module (SSCM) includes a LoRa® transceiver which receives the RID data from the processor in the form of an encoded data packet as explained below. The data packets are then broadcast in the clear and may be received by remote receivers. The remote receivers would similarly include a LoRa® receiver for receiving the data packets. A processor in the remote receiver would process the received packets and parse the packet into its individual data components for display or rebroadcast (relay).

For the WiFi connections (i.e. WiFi direct, WiFi relay), a client-server communication technique such as Server-Sent Events (SSE), WebSockets (WS), or Asynchronous JavaScript and XML (AJAX), among others, may be used to communicate the RID data (RIDD) from the server (airborne transmitter unit) to the client (remote receiver unit). This technique may also be used in the WiFi relay between the remote receiver/relay system (server) and remote display (client). Some practical considerations in choosing a network protocol are the frequency and amount of data to be conveyed and the necessity for client to server communication. Server-Sent Events is an excellent choice when communication is solely from server to client and WebSockets is useful when bi-directional server/client communication is required. In exemplary embodiments, the server is operating asynchronously so that multiple clients may be serviced at any given time. Additionally, the aforementioned communication techniques allow the remote receiver/display to be operated in such a way that updates of the UAS flight data are provided periodically to multiple clients automatically.

The RID data may be packaged for transmission using data encoding or data interchange techniques such as JSON (JavaScript Object Notation) or similar data array, which are useful for efficiently conveying the RID data from the server to the client. Since the FAA required RID data list is small, the data may easily be captured in a JSON or other data array. On the receiving end, the received data array is easily parsed, and the individual data components recovered, for display to the user on the display device (or rebroadcast in the case of radio relay). These techniques are well understood by engineers utilizing computer communication protocols.

In one exemplary embodiment, the communication is strictly from the server to the client and the SSE communication protocol is used, combined with a JSON data encoding scheme to convey the RID data from the server (transmitter) to the client (receiver/display). In another exemplary embodiment, the design includes communication from the client to the server such as altitude calibration, WiFi channel selection, operating mode selection, and other pre-flight initialization inputs. Thus, in this embodiment, the WebSocket (WS) implementation is used. In either SSE or WS case, RID data is sent to the client periodically and automatically without the need for a client request.

In one exemplary embodiment, upon connection of the client to the UAS/server network, html/JavaScript code provided by the server, is executed by the client with a web browser application. The client connects with the server by connecting to the server's network and then accessing the server's internet protocol (IP) address in the conventional way. In this exemplary embodiment, the html/JavaScript code permits reading, parsing, and displaying the packet data from the WiFi transmitter (server). As noted earlier, the WiFi networking, communication protocol, and data processing may be the same for both the WiFi direct and WiFi relay modes. The difference is that in the case of WiFi direct, the data is coming directly from the UAS server/broadcast module, whereas in the WiFi relay mode, the RID data is being received and then relayed from the V/UHF remote receiver/relay system (see FIG. 1c, 1d).

Some drone control links operate in the same 2.4 GHz part of the radio spectrum. Thus, if interference between the WiFi direct signal and the drone's control signal is a concern, the RF direct/radio relay function provides a means to mitigate the interference risk. The WiFi direct mode may be disabled and the RF direct/radio relay modes employed exclusively. Alternatively, the WiFi channel may be changed. A means for selecting operating modes and WiFi channels may be provided by a user interface module associated with the SSCM as discussed below. Alternatively, this selection interface might be provided by input from a display client as discussed with the WebSocket implementation As is well understood in the art, the WiFi network utilized in the WiFi direct or radio/WiFi relay modes would utilize a Service Set Identifier (SSID) generated by the server. This identifies the network to which the RID data remote receiver (client) would connect to receive and display the transmitted RID data. The SSID is specified by the IEEE 802.11 standard and can be up to 32 characters in length. Because of its length and the freedom to use almost any character in specifying the SSID, it can be used to convey useful information in addition to simply identifying the network. For example, the SSID might be used to convey some data regarding the UAS and how to connect to the network (e.g. IP address). This implementation is explored in FIGS. 6a-6c. In one exemplary implementation, the SSID is constructed with both a textual indicator that the WiFi network is associated with a UAS (e.g. 'Drone,' UA,' or 'UAS'), and identification of the broadcast module's internet protocol (IP) address to facilitate connection by end users (clients) to the network. In one exemplary embodiment, 'DRONE IP:xxx.xxx.x.x' is used as part of the SSID with xxx.xxx.x.x representing the UAS server's IP address. This leaves several more characters available which may be used by part of the RID registration serial number or just left for growth.

Figure 7:
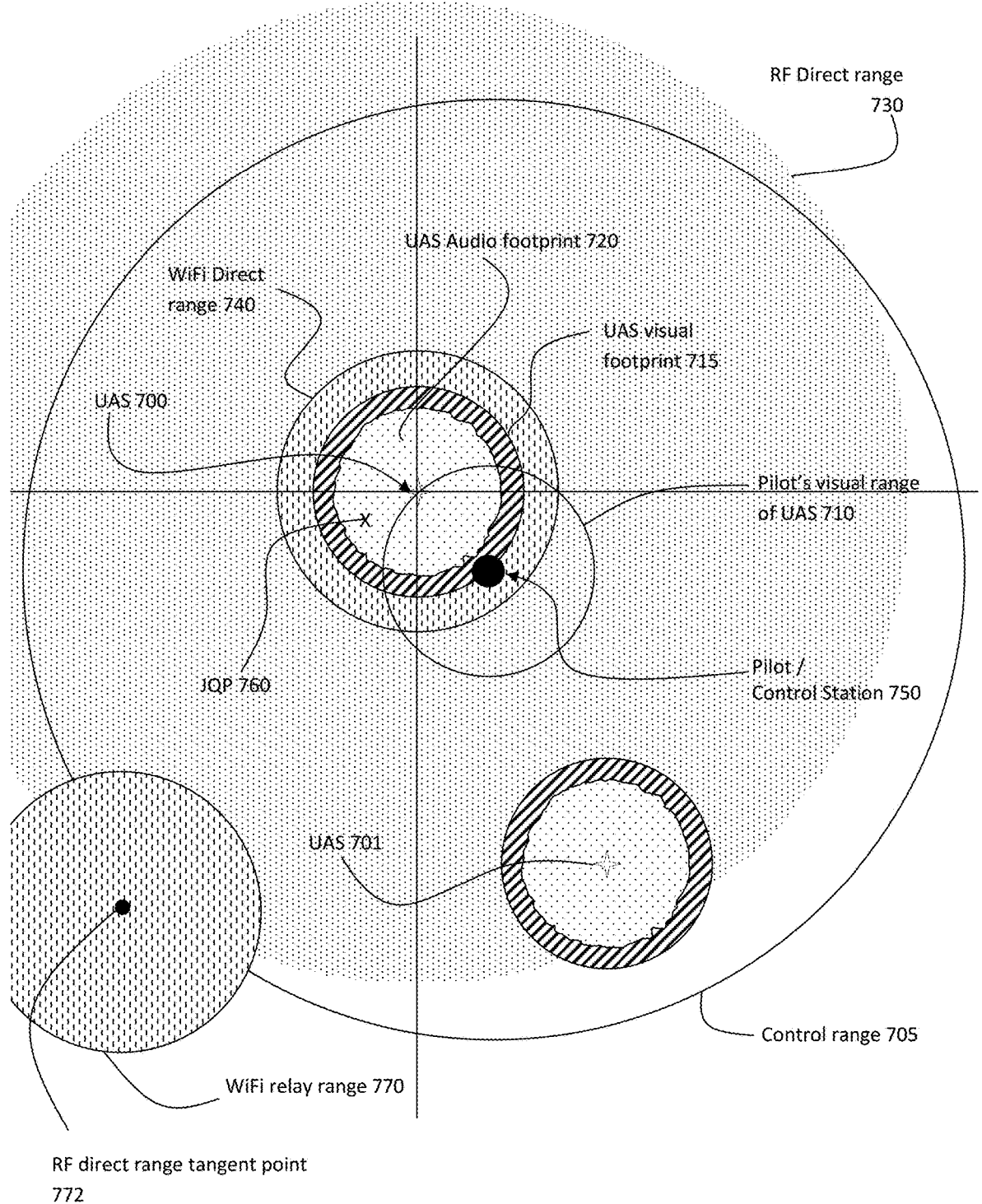
FIG. 7 is a pictorial illustration of some geometrical aspects of the invention.

While the range of WiFi is quite limited, it does align with what might be referred to as the unmanned aircraft zone of awareness. In other words, for the public to even notice a smaller unmanned aircraft, the aircraft must be relatively close, due to its small physical and auditory footprint. Thus, by the time an unmanned aircraft is in a position to be noticed and cause concern, it is already likely within WiFi range of the observer. FIG. 7 illustrates some geographical factors relevant to UAS discussions.

The FAA has mandated that the RID system transmit several pieces of UAS flight and take-off data. The transmitted UAS data includes UAS position (latitude/longitude), altitude, speed, and fix time. Also the UAS take-off position (latitude/longitude) and altitude are to be transmitted. Finally, a unique Remote ID is to be transmitted. The position data is required to be sourced from a GPS receiver. All data is to be transmitted at a 1 Hz rate with a latency of no more than 1 second. There are many GPS receivers available with various interfacing protocols available. In an exemplary embodiment, a u-blox GPS receiver is used with I2C interfacing.

As mentioned elsewhere in this specification, in exemplary embodiments, the remote ID (RID) data is packaged into data packets using JSON or some other encoding scheme, for efficient transmission. The data is then parsed or 'decoded' on the receiving end for display. This data packaging implementation works for both WiFi transmitted data and RF transmitted data.

One piece of RID data broadcast by the RBS is a remote ID number. The number is registered with the FAA and provides a unique identification link between the UAS and its owner, very similar to an automobile license plate. In one embodiment, the serial number is assigned by the manufacturer and 'hard coded' into the RBS at the time of manufacture. One concern is that data may be corrupted or 'spoofed' somewhere between transmission and reception, either innocently or nefariously. Checksums have long been used as means for determining the integrity of a message. As is well understood in the art, multiple means of check summing data are available. One simple method is constructing a parity bit or word associated with the data, known as a longitudinal parity check. In the case of the RID, the checksum may be associated with all of the RID data (RIDD) or may be associated with only the RID serial number. In the case of a data wide checksum, the checksum value would obviously need to be computed continuously due to the continuously variable nature of the data. If the checksum were applied only to the RID serial number, the checksum could be computed and hardcoded in the RBS transmitter software at the time of manufacture. The checksum value, however implemented, would be transmitted as part of the RID data. The remote receivers could then compute a checksum based on the received RID data and compare it to the transmitted checksum. Any discrepancy would cause an alert to be raised.

Another type of data integrity check well known in the art is the cyclic redundancy check (CRC). An interesting feature of this method is that some hardware have this function built in, and it simply has to be 'turned on' in the code. The RFM9x LoRa® modules are just such hardware. In an exemplary embodiment, the RFM9x LoRa® module with CRC enabled is utilized for the V/UHF RF link discussed above.

The system may perform a self-test at start-up and notify the pilot of the test results. Additionally, the system may monitor the system during flight and notify the pilot of any malfunctions. Alerts and statuses which may be implemented include the following:

Self-test complete/self-test fail—indicates status of the initial self test items. Tested items may include the presence and proper function of the GPS receiver, the V/UHF radio (if so equipped), the WiFi transceiver (if so equipped).

Initializing PVT—indicates that the RBS is conducting its initialization. Initialization may include waiting for GPS data to become valid, determining data stability by performing statistical analysis of the data, especially altitude, and taking initial GPS reading of position and altitude. The analysis of the altitude data during the initialization may include a test for altitude convergence to a steady state value. In some embodiments, the system may include a means for the operator to enter the known value of the take-off elevation for reference during initialization.

GPS data not available or invalid (GPS disconnected/inop)—A continuous check of the GPS data availability, the lack of which may indicate a broken physical connection with the GPS or a lack of valid data.

Network status (WiFi & V/UHF)—A check of the wireless network/connection between the receiver(s) and the transmitter(s). This may be conducted for both WiFi and V/UHF connections if so configured. May be checked on both sides of the network; client/server, receiver/transmitter.

RID data checksum—An annunciation may be raised if the checksum computed by the receiver does not match the checksum transmitted by the RID transmitter.

Stale data—An annunciation may be raised if the data has not been updated within a certain time.

The RID data may be displayed to end users in a variety of ways. In either of the two WiFi modes (direct or relay) where the UAS data is being displayed on a WiFi enabled device, the data may be presented on a web page using a web browser as is commonly done with internet connections. Alternatively, dedicated software applications may be employed to receive and display the data in unique formats.

As explained elsewhere, in one exemplary embodiment, html/JavaScript code runs in the client (i.e. remote receiver/display) upon connection of the client to the UAS' network and access of the broadcast module's (i.e. server's) Internet Protocol (IP) address, very similar to accessing an internet website. In this exemplary embodiment, the html/JavaScript code contains the instructions for reading, parsing, and displaying the data packet from the WiFi transmitter (server). This implementation utilizes a conventional web browser and eliminates the need for a dedicated 'app' to be downloaded from an 'app store' by the end user prior to accessing the RID data. In an exemplary embodiment, the JavaScript code is contained in a code file imported into the SSCM flight code at compile time and transferred to the client at connect time, much the same as connecting to a website.

Alternatively, the RID data may be displayed using a serial interface between the remote receiver and the display device. In one exemplary implementation, the received data is made available on a serial interface which may then be output to an externally connected monitor for display. There are several 'freeware' applications for displaying serial data. Often these applications are referred to as 'serial emulators.' One example is PuTTY which is adapted to run on WINDOWS® machines. Others are available for Android or Apple devices. These applications print out the stream of serial data input to one of the device's serial ports. In another implementation, a Liquid Crystal Display (LCD) is used to display the received RID data. This implementation might be especially useful for the pilot, as it frees his/her smartphone for other mission uses such as photography or video capture. An audio alert may also be included in addition to visual display to alert the pilot to abnormal conditions.

Figure 1B:
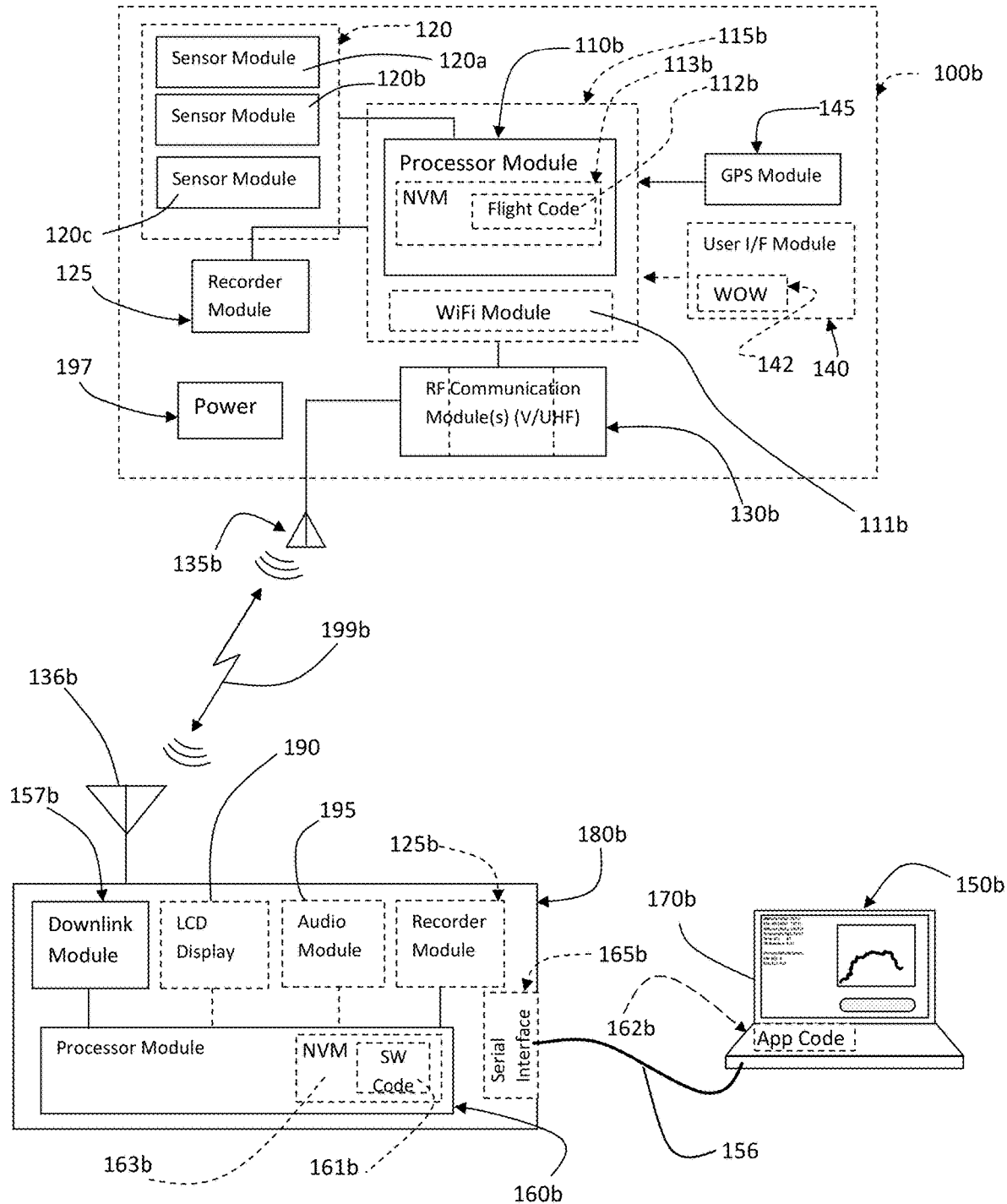
Figure 1C:
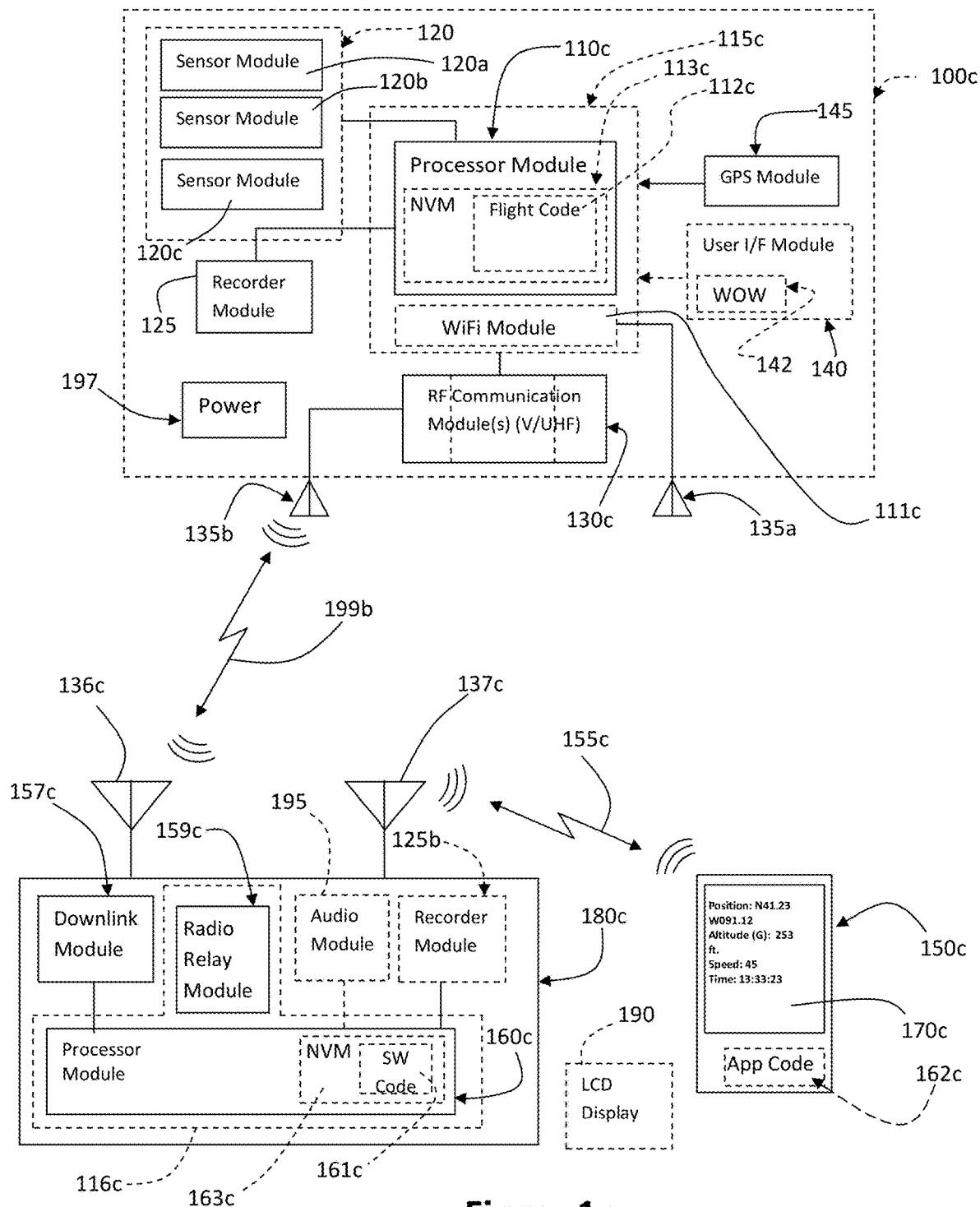
Figure 1D:
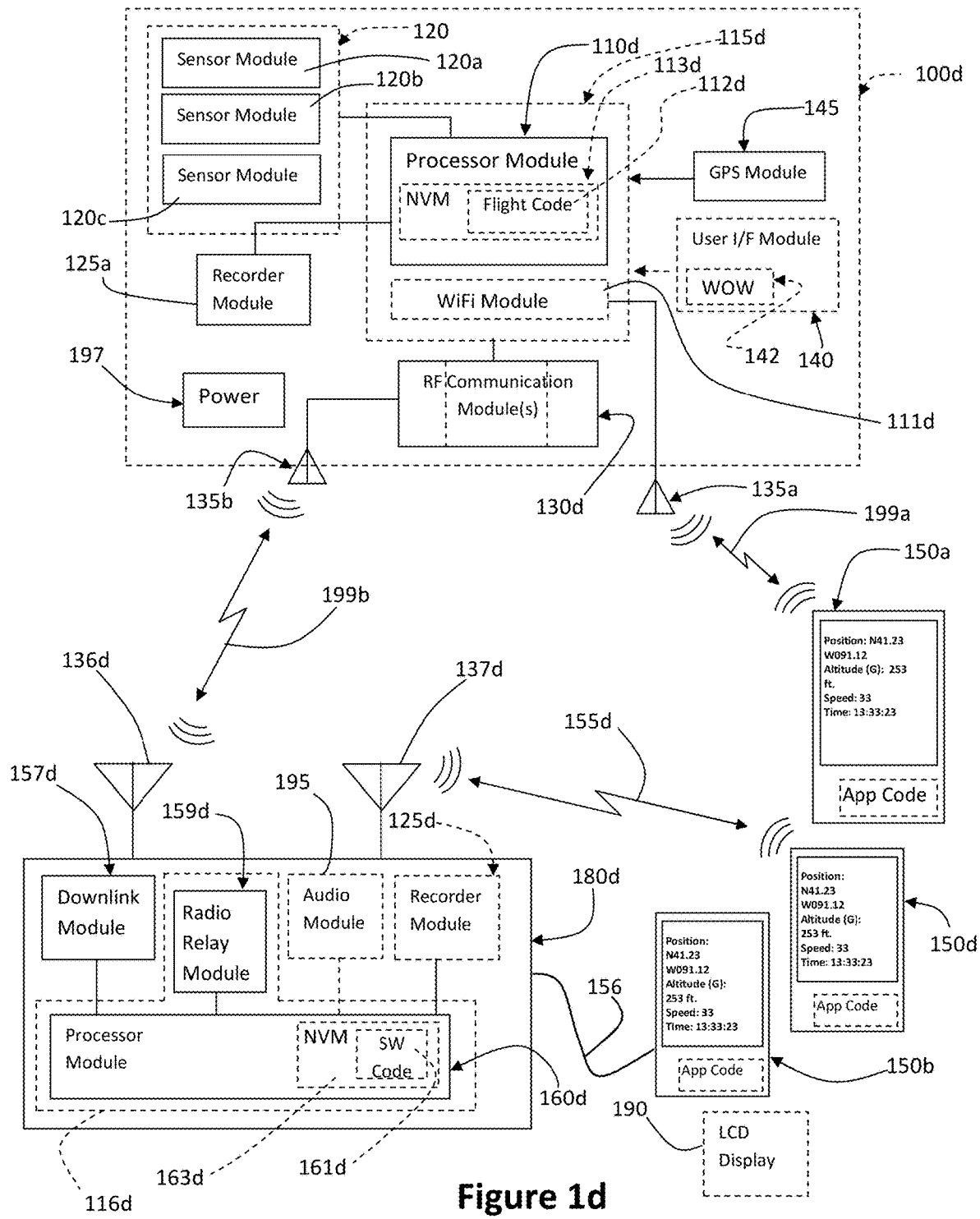

The multimode design is illustrated in FIGS. 1a-1d. The modes include WiFi direct broadcast (FIG. 1a), RF direct (V/UHF) (FIG. 1B), and radio relay (FIG. 1c). Additionally, the modes may be operated in various combinations, including all modes operating simultaneously as illustrated in FIG. 1d.

In the WiFi direct mode (FIG. 1a), there are two main hardware components, the airborne sensor suite/communication module (SSCM) 100a operating as the server, and the remote receiver/display device (RRDD) 150a operating as the client. The SSCM 100a is designed to be removably attached or otherwise integrated with the UAS, and the remote receiver/display 150a is proximate to the UAS RID data consumer. In this implementation, the remote receiver/display 150a is not part of the invention per se but is an off-the-shelf WiFi enabled device with a display interface 170a, such as a smartphone, lap top computer, smartwatch, tablet computer, or other such device. In one exemplary embodiment, the server (SSCM) flight code includes html/JavaScript code for the client (RRDD) to execute which controls the display of UAS data received via the WiFi connection. Thus, any WiFi enabled device having an application 162a capable of running html/JavaScript commands, such as a common web browser, is able to display the received data. No special application program ('app') is required. It should be noted that although a single remote receiver/display device (RRDD) 150a is shown in the figure, multiple such devices may connect to the SSCM server 100a at any given time, as is well understood in networking technology.

The sensor suite/communication module (SSCM) 100a includes the sensor, processor, and communication components necessary to acquire, process, and transmit the UAS remote ID data. To accomplish that, the SSCM 100a includes a GPS sensor 145 for acquiring the position, altitude, and speed data required, a processor 110a for receiving the GPS data, and a communication module 130a for communicating the UAS remote ID data to RRDDs 150a. The SSCM 100a may also include an optional recorder module 125 for storing the remote ID data and an optional user interface module 140.

In an exemplary embodiment, the SSCM 100a broadcast module is designed to be a stand-alone device, i.e. not physically or electrically integrated with any of the air vehicle's structures or components. It is designed to be removably attached to a UAS such that it is easily movable from one UAS to another. Also, since one of the primary uses of the remote identification broadcast module is as a retrofit for older and smaller recreational unmanned aircraft, size and weight are primary considerations in addition to its transportability between UAS.

The communication module 130a is the subsystem component which wirelessly transmits the RID data to one or more remote receiver/display devices (RRDD) 150a. In the WiFi direct implementation of FIG. 1a, the communication module 130a is a WiFi transceiver. The communication module 130a transmits the RID data from the SSCM 100a to the RRDD 150a over WiFi network 199a. In a typical usage, a remote receiver/display 150a would be positioned within close visual range of the pilot operating the UAS, and other remote receivers might be used by public safety or members of the public depending on the circumstances. Of course it is entirely possible that the only remote receiver/display 150a would be held by the pilot who has an FAA imposed duty to monitor the UAS RID data during flight. It is anticipated that in many usages, the remote receiver/display 150a will be realized as a smartphone. As mentioned above, and discussed in more detail below, WiFi communication techniques are employed that allow multiple users to connect and receive periodic updates automatically.

WiFi transceivers are frequently paired with a processor to form an integrated wireless WiFi/processor module 115a, sometimes referred to as a 'System on a Chip' (SoC). In an exemplary embodiment of the invention, a module 115a integrating a WiFi transceiver 130a and processor 110a is used. In one embodiment, the ESPRESSIF ESP-32, comprising a Xtensa dual core 32-bit processor and a WiFi transceiver is used. In another embodiment, they are realized in an Atmel (Microchip) ATSAMW25 integrated microcontroller/WiFi module. Such integrated communications module offerings provide not only a drop-in design component but also an inherited design and functional maturity which would otherwise take years to achieve in a native design. Additionally, this can result in a substantial savings in parts count and board real estate, as well as a financial savings.

In an exemplary embodiment, the WiFi module is configured to act as a wireless access point ('softAP') to establish the WiFi network, and acts as an asynchronous web server to communicate with one or more remote receivers 150a over network 199a. Details of how the WiFi module 130a communicates with the receiver/display 150a are discussed below in connection with software application 112a.

Processor 110a, controls the flow of data in the system as well as initialization of sensors, and integrating all major components of the system. As just mentioned, the processor 110*a* and the communication module 130*a* may be combined into a single integrated component such as a System on a Chip (SoC) WiFi/processor module 115*a*. In an exemplary embodiment of the WiFi direct implementation, the ESPRESSIF ESP-32 WiFi module is used. This module not only provides WiFi functionality used to wirelessly communicate the remote ID data to the remote receiver/display device (RRDD) 150*a* but also includes an Xtensa dual core 32-bit processor, memory, and a multitude of I/O interfaces. The processor side of the module 115*a* includes non-volatile memory (NVM) 113*a* into which the software flight code 112*a* may be loaded.

Processor operations are directed by execution of flight code 112*a*. In order to provide secure operation, flight code 112*a* may be factory preloaded. Processor 110*a* interfaces to communication module 130*a* and sensor suite 120, including at least GPS sensor 145. Processor 110*a* may also optionally be interfaced to recorder module 125 and user interface module 140. In an exemplary embodiment, the flight code 112*a* causes the processor 110*a* to periodically sample or 'read' data from the GPS 145. Upon receipt of sensor data from the GPS 145, the processor module 110*a* may perform certain processing of the data prescribed by the flight code 112*a*. Data processing may include monitoring for alert and warning conditions such as data validity. Additionally, initialization programming processes may be controlled by processor module 110*a* based in part on pre-flight initialization parameters. Examples include setting WiFi transmit power and channel, setting WiFi credentials, and establishing the WiFi network used to transmit the RID data to WiFi enabled devices 150*a*. Additionally, certain GPS modules 145 allow user selectable data output formats and rates. The values setting these initialization parameters may be constants in the flight code 112*a*, obtained through the client interface 150*a*, or may be obtained from user interface 140. Coupling of the GPS module 145, interface module 140, optional recorder module 125, and processor module 110*a*/SoC module 115*a* may be by standard interfacing protocols such as I2C, SPI, UART (serial) or the like. Specific choice will be driven by the components selected for the implementation.

Optionally, processor 110*a*/SoC module 115*a* is integrated with recorder module 125 to record remote ID and other flight data during the UAS flight. The recording may be at a periodic rate or on demand. Recording of the remote ID data gives the operator evidence that the flight was conducted in accordance with FAA regulations and may provide useful data in the event of an accusation, accident, or incident. In an exemplary implementation, the remote ID or other flight data is recorded to a portable storage media, such as an SD card, in a comma delimited format so that it may be easily parsed and imported into existing commercial applications such as EXCEL spreadsheet for easy plotting or other analysis.

Processor 110*a*/SoC module 115*a* may also be interfaced to a user interface module 140. The user interface module 140 could include functions such as a weight-on-wheels (WOW) sensor 142, used to determine if the UAS is on the ground or in the air. The WOW module may be a physical 'hard' switch or a virtual 'soft' switch. The user interface module 140 may also include one or more visual indicators. For example, a light emitting diode (LED) might be used to indicate that the broadcast module 100*a* is performing properly or that a certain point in the software is being executed. For example, the processor 110*a*, executing flight code 112*a*, might be instructed to 'flash' the LED at a predetermined execution point, thereby giving a visual indication of proper operation to the operator. The user interface may include a means for selecting WiFi channel, power output, communication operating modes (WiFi direct, WiFi relay, RF direct, or any combination), initialization altitude and the like.

The user interface module 140 may include a means for easy download of recorded remote ID data. In one embodiment, the SSCM 100*a* may include a connector such as a USB connector such that the SSCM 100*a* may be 'plugged' into a computer to read/download the contents of the recorder module 125.

The SSCM 100*a* may also comprise non-volatile memory (NVM) (a.k.a. non-transitory storage media) 113*a*. The non-volatile memory 113*a* could be a discrete module in the SSCM 100*a*, or it could be integrated into the processor module 110*a*/SoC module 115*a*. The non-volatile memory 113*a* may store initialization parameters, remote ID data, or the like. The memory 113*a* may also store computer flight code or instructions 112*a*. In an exemplary implementation, the non-transitory storage media 113*a* is part of the processor/WiFi module 115*a* and is used to store UAS take-off position, as well as the software instruction code 112*a*. The NVM may also be referred to sometimes as a non-transitory storage medium for computer software.

The sensor module(s) 120 represent the hardware, circuitry and processing necessary to measure UAS remote ID data such as position, speed, altitude, attitude, acceleration, and other data. The FAA has specified that the position, altitude, and speed data is to be sourced from a GPS sensor. Thus, in the exemplary embodiment, the sensor suite includes at least a Global Positioning System (GPS) 145 to acquire vehicle position and other navigational information such as altitude and speed. There are many commercial off-the shelf (COTS) GPS sensors on the market. Some GPS module manufacturers are u-blox, Trimble, Sierra Wireless, ADH-tech, and Broadcom, to name just a few. There are also manufactures which integrate a GPS receiver and a microcontroller such as Qualcomm and STMicroelectronics. These GPSs may have interfaces such as serial, I$^2$C, and SPI. They may output their GPS solutions using, proprietary or non-proprietary formats such as the NMEA format. All output their navigation solutions at a rate of at least 1 Hz. In an exemplary embodiment, a u-blox GPS sensor utilizes an I$^2$C interface to the processor 110*a*/SoC module 115*a*. Although GPS is the primary sensor, additional sensors may be added for additional or complementary data such as an Inertial Measurement Unit (IMU), an accelerometer, barometric pressure sensors, or even an additional GPS sensor for redundancy checking. These additional (secondary) sensors may be used to 'check' the performance of the primary sensor or to add additional data to the collection of flight data.

Regardless of the communication module realization, transmission of the UAS data to remote receiver/display 150*a* will generally require an antenna. In FIG. 1*a* it is seen that the communication module(s) 130*a* is connected to one or more antenna 135*a* for broadcast of the remote ID data. In some embodiments, this may be a simple ¼ wavelength wire which can be placed anywhere so as not to interfere with flight operations. In other embodiments, the antenna may be integrated with the communication module itself (e.g. PCB trace antenna). In still others, the design may allow for flexibility to use either an external or integrated antenna. The ESP32 utilized in exemplary embodiments of the present invention includes models which fall into each of these options. In one exemplary embodiment, the PCB trace antenna is utilized. In another exemplary embodiment, the external antenna model is utilized.

When implementing an antenna design, one consideration is the radiation pattern of the antenna. As just one example, if the radiation pattern for the PCB antenna shows its maximum gain in the z-axis (i.e. perpendicular to the plane of the board), it would maximize range if the board could be oriented in mounting such that the plane of the board is perpendicular to the ground, i.e. maximum antenna gain is directed downward (toward the ground). Also any hardware design guidelines of the communication module should be noted. For example, in an exemplary implementation using the ESP32 module, the module should be placed on the base board such that the PCB antenna extends outside the base board.

In the WiFi direct mode, a WiFi enabled remote receiver/display device (RRDD) 150a provides the majority of the human/machine interface (HMI) such as display of the remote ID data and any alerts. The remote ID broadcast module system is designed such that minimal to no modifications are required to the remote receiver/display device (RRDD) 150a to perform the HMI functions. As mentioned, remote receiver/display device (RRDD) 150a may be realized as a commercial off the shelf WiFi enabled device having a processor, and a display means 170a for displaying the received data to the user. Such devices are sometimes referred to as smart devices. The smart device 150a may also have a means for receiving operator input, such as a touch screen display. Some examples of such off the shelf RRDDs 150a, by no means exhaustive, are laptops, tablet computers, PDAs, smartwatches, and the ubiquitous smartphone. It is also envisioned that the remote receiver/display device (RRDD) 150a would have an application, such as a web browser, running to execute the html/JavaScript code provided by the server (SSCM) 100a for receiving, parsing, and displaying the received RID data. Some examples of pre-installed browsers are Chrome and Safari.

Computer software instructions 112a ('fight code') loaded into the non-volatile memory 113a of the SSCM processor module 110a/SoC module 115a when executed, control the functioning of the remote ID broadcast module. These instructions will, among other things, control the initialization sequence, data collection, processing, and transmission of data on the wireless network(s). The specifics of these functions are described in more detail below in connection with FIGS. 5a-5d. In an exemplary embodiment, the SSCM software instructions 112a are factory preloaded.

As part of the initialization/start-up, code 112a defines & initializes variables, defines data structures, sets-up and initializes the WiFi direct network, and configures the GPS. As part of the GPS configuration, the output format and output frequency may be selected. The WiFi network is initialized by defining the WiFi mode (e.g. station, access point, station/access point), the SSID, and, if utilized, the network password. In the present invention, the purpose of the FAA mandate requires the UAS data be broadcast in the clear (i.e. no password) so that any interested party may receive it. As mentioned elsewhere, in an exemplary implementation, the WiFi mode is set to Access Point ('softAP') such that it acts as the server supplying the RID data to connecting clients ('soft' refers to the fact that the module is not connected to a wired network, i.e. the internet).

As mentioned elsewhere, the SSID may be chosen to maximize the information conveyed to potential network clients. For example, the word 'drone' or 'UAS' may be used as part of the SSID to identify the network as emanating from a drone. The IP address may be included, giving potential clients information they need to connect. Still further, all or part of the remote ID broadcast module serial number (s/n) may be given to identify the drone. In short, the SSID may be used to provide the public and even law enforcement all the information they need to identify the UAS owner, without ever even connecting to the UAS network. This is especially useful since it has been noted in testing that the SSID can be 'seen' much further than the RID data may be received. The SSID function is discussed more below in conjunction with FIGS. 6a-6c.

After the WiFi and sensors have been initialized, the code begins the position, velocity, time (PVT) initialization. As mentioned, the FAA requires the take-off position and altitude to be continuously transmitted as part of the RID data. This data is captured at start-up when the drone is positioned for take-off. As part of the initialization loop, the GPS sensor is continuously queried, looking at the data validity flags and fix quality indicators to determine when the data is usable. Once the data becomes valid, a series of altitude measurements are taken and checked for stability. Once the data, especially the altitude, stabilizes, a snapshot of the take-off data is taken.

Once the take-off position has been determined, the code moves into the main loop where it continuously reads the GPS sensor 145, retrieving the required position, speed, altitude, and fix time information and packages it for transmission on the WiFi network 199a to the remote receiver/display device 150a. This main loop is also referred to as the 'flight loop' as it is the code executing during flight. In an exemplary implementation of the WiFi direct mode, required data is read from the GPS receiver 145 and placed into a data structure defined at initialization. The data structure is then used to pack the data elements into a comma delimited data array (packet) and sent to the WiFi enabled remote receiver/display 150a for parsing by the html/JavaScript code described above.

As was mentioned, in an exemplary implementation, Server Sent Events (SSE) is used as the network protocol for updating the received UAS remote ID data received by the client (i.e. remote receiver/display 150a). The html/JavaScript code contains a data structure definition identical to that in the flight code, which is used to parse the received data for display. The JavaScript code also defines the display format used to build a web page used to display the data (see FIGS. 4a-4h). Using principles well understood by those in the art, an event source is used to open a connection between the server and the client through which events (e.g. updated UAS data) are passed from the server to the client. An event listener receives the incoming events (e.g. updated UAS data) and parses it according to the data structure defined in the html/JavaScript executed in the client. As mentioned, in an exemplary embodiment, a JSON parser is used. In an exemplary embodiment, the flight loop in code 112a is continuously executed ('open loop') which sends an updated event each time through the loop. In another exemplary embodiment, the update event occurs at a scheduled interval. Either way, software design and testing are used to verify the loop is executed with sufficient frequency so as to meet the FAA's requirements on latency and update rate.

Another exemplary client/server networking protocol is WebSockets. This protocol is differentiated from the Server Sent Events protocol primarily by its bi-directional communication. Thus, for implementations where information is communicated from the client to the server, the WebSocket implementation is favored. Examples where this implementation is used include where pre-flight initialization information is provided to the RID module such as selection of WiFi channels, transmit power, field elevation, and the like.

In addition to the event listener for the incoming UAS data, event listeners may also be defined for error and alerting messages received from the server side as well as client side generated alerts. Alerts may comprise routine status alerts as well as alerts for abnormal conditions. An example of a client side alert might be the loss of connection to the UAS/server. Such an alert must be generated on the client side since a loss of connection to the server means no server side alerts could be received.

One example of a server side alerting condition is when sensor data is lost. As an example, if a pre-specified time period elapses without fresh data, the existing data may be declared 'stale' and the operator notified via a display alert which may be communicated to the remote receiver/display over the WiFi interface. Routine status alerts may include indicating the execution of the position, velocity, time (PVT) initialization or self test completion during start-up. The alerts include both visual (on the display) as well as audio or tactile (vibrating).

The RF modes include RF direct (FIG. 1B) and radio relay (FIG. 1c) both of which include the remote ID data sensing function described above in connection with the WiFi direct implementation but utilizes a V/UHF long range downlinking function in addition to or instead of WiFi. (Note: Although each of the modes are being discussed separately for clarity, in fact, they are not mutually exclusive and may be implemented together in one system. Note also that when discussing 'RF,' it is meant to encompass radio frequency, i.e. wireless communication in the V/UHF bands using any one of numerous modulation techniques including but not limited to FSK, MSK, OOK, and LoRa® to name just a few). Similar reference numerals are used to identify similar components with 'a,' 'b,' 'c,' and 'd' appended to represent the particular figure/mode being discussed.

The RF direct and radio relay modes include an RF transmitter 130b, c in the SSCM 100b, c and a receiver/relay 180b, c which functions as a receiver and, in the case of the radio relay mode, a relay. For clarity, the RF direct (FIG. 1B) and radio relay (FIG. 1c) modes will be discussed separately.

V/UHF communications generally have a longer range than WiFi and thus, the RF downlink function adds a longer range transmitter component to the SSCM 100b so that the remote ID data can be downlinked to a remote receiver/relay system (RRRS) 180b at a much longer distance than a WiFi signal. The RRRS 180b receives the downlinked remote ID data and then presents it on a display such as an integrated LCD display 190. Alternatively, or additionally, the data may be displayed on an external remote receiver/display device (RRDD) 150b such as a laptop computer, or the like. Interface to the LCD 190 will be through a protocol compatible with the particular LCD device. Interface to the smart device 150b might be through a wired serial interface 156, using the serial port available on most smart devices. In the case of the wired connection, a serial emulator application, as was discussed earlier, may be used on smart device 150b to receive and display the RID data.

Note that although only one RRRS is shown, the SSCM 100b is designed to support multiple RRRS/connected display devices at any given time in the same way that many receivers can tune into the same commercial radio station. Also, a given RRRS may support multiple devices, some of which might be connected wirelessly and others with a wired connection (see FIG. 1d).

As mentioned, the RF direct embodiment modifies the WiFi direct implementation by substituting (or adding) a long range V/UHF radio function to the communication module 130b. In this embodiment, the sensor suite/communication module (SSCM) 100b is wirelessly connected to a remote receiver/relay system (RRRS) 180b through wireless V/UHF downlink 199b. The remaining components of the sensor suite/communication module (SSCM) 100b, namely processor module 110b/SoC module 115b, sensor module 120b, GPS 145, user module 140 and recorder 125, function as described above. The remote receiver/relay system (RRRS) 180b is positioned such that the display device(s) (remote receiver/display device 150b or LCD 190) may be positioned within visual range of the pilot, law enforcement, or other public safety official or public observer.

Note that in an exemplary implementation of the RF direct mode, the same integrated module 115b utilized in the WiFi direct mode is used regardless of whether the WiFi capability is used (i.e. module 115b is the same as 115a in the WiFi direct namely ESPRESSIF ESP-32). Note that regardless of whether the WiFi direct functionality is implemented, the processor side 110b of the integrated ESP-32 module 115b may be used for processing functions with the WiFi functionality turned OFF or ON, as dictated by the mission. Advantages of using common components are versatility by enabling configurability at the software level and also reuse of common software modules.

In the RF direct embodiment of FIG. 1B, the SSCM 100b and RRRS 180b communication module 130b and downlink module 157b respectively, comprise long range communication modules. In an exemplary implementation, LongRange (LoRa®) communication modules are used such as HOPERF RF which offers integrated RF modules for V/UHF communication such as the LoRa® RFM9x modules. In particular, the RFM95CW module is FCC registered as required by the FAA Remote Identification regulations. Such integrated communication module offerings provide not only a drop-in design component but also an inherited design and functional maturity. In an exemplary implementation, the LoRa® radio is implemented in packet mode with the RID data being encoded into a JSON or other parseable data array (packet). This is similar to what was done in the WiFi direct mode and will be discussed more below in connection with the SSCM and RRRS software 112b, 161b respectively. Downlink communication module 157b receives the long-range V/UHF UAS remote ID data transmitted by the SSCM 100b communication module 130b over RF path 199b. Note that in exemplary embodiments, communication module 130b and downlink module 157b are transceivers, allowing uplink of data to the SSCM 100b for pre-flight or other programming in addition to downlinking the RID data.

An audio module 195 may also be integrated as part of the RRRS 180b for outputting an audio alert. Under most situations, the attention of the pilot will necessarily be directed to flight operations and mission requirements with monitoring the RID system a lower priority. However, the FAA requires the pilot to monitor the system, and if it quits operating, to land the vehicle as soon as safely and practically possible. The audio alert is a means for allowing the pilot to maintain focus on flying the UAS, while also monitoring RBS operation, by providing a means of notifying him/her should something in the remote ID system need his/her attention. The audio device can be anything which emits a human perceptible sound of an attention-getting volume such as a piezoelectric speaker. The audio alert, in combination with the alert messaging system described above, would provide the pilot with the information needed.

In addition to displaying the UAS RID data textually, the RRRS 180b may be connected to a display device 150b such as a smartphone capable of displaying the position of one or more UAS on a moving map, e.g. Google Maps, based on received RID data. Such an implementation might be useful for pilots in manned aircraft for tracking and avoiding nearby UAS or for public safety officials tracking multiple UAS (see FIG. 3c).

As in the WiFi direct embodiment described above, computer flight software instructions 112b ('flight code') are loaded into SSCM processor module non-volatile memory (aka non-transitory storage media) 113b. Processor 110b/SoC module 115b, executing the flight software instructions 112b, allows SSCM 100b to perform the RID data acquisition and broadcast functions described above. Additionally, in RF direct mode, receiver/relay software 161b is loaded into receiver/relay processor NVM (non-transitory storage media) 163b, performing the receiver/relay functions discussed below. In an exemplary embodiment, the SSCM software instructions 112b and receiver/relay software 161b are factory preloaded.

In the RF direct mode, the SSCM software 112b performs the same system and GPS sensor initialization sequences described above. In addition, the long-range V/UHF radio is initialized by setting radio parameters. Radio initialization parameters vary by radio but may include transmit power and frequency, modulation mode, hardware interface parameters, and for LoRa® radios spread factor, bandwidth, coding rate, and CRC enablement. After initialization, software 112b continuously queries the GPS receiver, as discussed above, to obtain the data needed for periodic RID data updates. In an exemplary implementation of the RF direct mode, the RID data is placed into a data structure used to populate a data array, which is then broadcast by the RF radio as a data packet to remote receiver/relay system 180b.

The RRRS 180b receives the RF broadcast RID data 199b, using downlink module 157b, which is compatible with the transmit side of communication module 130b. In an exemplary implementation, downlink module is a LoRa® transceiver. Processor 160b interfaces with the downlink module 157b and communicates the received RID data to a display device. As mentioned above, display devices may include an integrated display such as LCD display 190 or an external display device 150b. In this embodiment, a wired serial connection 156, such as a USB connection, may be used. (Wireless communication with an external display device is the subject of the 'radio relay' mode described below). Note that in an exemplary embodiment, the wired connection 156 may be a USB connector of a form factor allowing RRRS 180b to be directly plugged into the display device 150b, eliminating the need for any actual cabling (see FIG. 3c).

Serially provided RID data to display device 150b by RRRS 180b, may be displayed using a specially designed application running on display device 150b or a simple terminal emulation application. Several open source terminal emulation programs exist depending on the operating system on which the display system is running. Some examples being PuTTY, Cmder, and ConEmu (WINDOWS®), and Terminal Emulator, and Termux (ANDROID™). The software code 161b resident in NVM 163b and executed by processor 160b in the RRRS 180b includes computer instructions, the execution of which enables the receiving and display functions of the remote receiver/relay system (RRRS) 180b. The transmitted RID data packet is parsed by the software code 161b into its constituent components, according to a data structure definition, complementary to the data structure definition on the transmitter side, and then communicated to display 190 or 150b for display. The functions of code 161b are discussed in more detail below in conjunction with FIG. 5d.

The discussion above regarding integrated processor communications modules in SSCM 100a and 100b is also applicable here. In one exemplary embodiment, processor 160b is an ESPRESSIF ESP-32 module. In another embodiment, it is realized in an Atmel (Microchip) ATSAMW25 integrated microcontroller/WiFi module. As discussed above, ESPRESSIF provides the ESP series of modules some of which include WiFi functionality, Bluetooth functionality, or both, in addition to an Xtensa microcontroller with dual core 32-bit processor, memory, and a multitude of I/O interfaces (processing). Note that in addition to its other capabilities, the ESPRESSIF ESP-32 module also includes serial communication capabilities. In the case of serial communications, processor 160b may comprise serial interface circuitry such as a Universal Asynchronous Receiver/Transmitter (UART) to enable Universal Serial Bus (USB) communication with external devices such as the display device 150b. Note as stated above in connection with processor module 110b, the WiFi capabilities of the integrated processor module 160b may be turned ON or OFF, depending on implementation. In the case of the RF direct mode, they may be OFF, whereas in the case of the WiFi relay 160c, they would be ON. Note that for clarity, the WiFi side of module 160b is not shown in FIG. 1B.

RF transmission will generally require an antenna. In FIG. 1B, the RF communication module(s) 130b is connected to one or more antenna 135b for broadcast of the remote ID data. Remote receiver/relay system (RRRS) 180b would similarly include an RF compatible antenna 136b. In some embodiments, this is a simple ¼ wavelength wire which can be placed anywhere so as not to interfere with flight or ground operations. Generally, the SSCM antenna 135b would be placed on the underside of the UAS to maximize antenna radiation (gain) in the downward direction during airborne operations. In some implementations, it might be advisable to also have an antenna on the top side of the UAS to facilitate reception by airborne receivers, such as in case of manned aircraft tracking UAS (see FIG. 3d)

The RRRS 180b may include a remote ID data recorder 125b for recording remote ID data. The recorded remote ID data may then be analyzed post-flight to accomplish various purposes such as liability mitigation, evidence of regulatory compliance, or just virtual recreation of the flight.

As mentioned, the display device 150b (e.g. smartphone, laptop, tablet etc.) provides the majority of the human/machine interface (HMI) such as display of the remote ID data. In an exemplary embodiment, the remote ID broadcast system is designed such that minimal to no modifications to the display device 150b is required to perform the HMI functions. As mentioned, display device 150b may be realized as a commercial off-the-shelf device having a communication module for receiving serial input data, a processor, and a display means 170b for displaying the received data to the user. The device 150b may also have a means for receiving operator input, such as a touch screen display or keyboard. Some examples of such off the shelf display 150b examples, by no means exhaustive, are laptops, tablet computers, PDAs, smartwatches, and smartphones. In an exemplary embodiment, existing commercial applications such as a terminal emulator (for serial input data) or a web browser (for wireless data) would be utilized. In other embodiments, app code 162b may be software code written specifically for the remote ID data monitoring purposes of this invention.

The radio relay mode combines aspects of the WiFi direct and RF direct modes to achieve an optimization of range and usability by merging the long-range of V/UHF and the wide availability of WiFi enabled display devices. (Note that WiFi is just one of the 'radio' relay protocols). The concept behind the radio relay modes is that the RID data may be downlinked in one RF domain and then 'translated' and relayed in another RF domain. Some relay domains include cellular, WiFi, and Bluetooth, to name just a few. In one exemplary implementation, the WiFi relay domain is used such that the relayed RID data may be displayed on commonly available WiFi enabled devices such as laptop computers and smartphones or smart watches. As such, the radio relay mode leans heavily on the design components discussed above for the WiFi direct and RF direct implementations.

In the WiFi implementation of the radio relay function (see FIG. 1c), the communication (i.e. relay) of the RID data is made wirelessly to a WiFi enabled remote receiver/display device 150c through remote receiver/relay system (RRRS) 180c; i.e. receiver 180c acts to relay the RID signal from the SSCM 100c to the remote receiver/display 150c. In an exemplary implementation, the interface between the remote receiver/relay system (RRRS) 180c and the WiFi enabled remote receiver/display device 150c is very similar to the interface between SSCM 100a and the WiFi enabled remote receiver/display device 150a in the WiFi direct mode. Namely, the remote receiver/relay system (RRRS) 180c acts as the server, establishing a softAP network to which the WiFi enabled remote receiver/display device 150c client connects. In an exemplary embodiment, the RRRS 180c functions as an asynchronous web server, using one of the network topologies discussed above. In an exemplary implementation of WiFi relay, the server updates the RID displayed on the WiFi enabled remote receiver/display device 150c client, using the Server Sent Events networking protocol. The flow of data is from the SSCM 100c to the RRRS 180c via the V/UHF RF path 199c as described above in the RF direct mode. The RRRS downlink module 157c receives the RID data which is then processed by the RRRS processor 160c and then forwarded to the radio module 159c. The relay module then wirelessly communicates the RID data to the remote receiver/display device 150c. As described above, the processor 160c and radio relay module 159c may be comprised by a single processor/WiFi SoC module 116c. In an exemplary WiFi implementation, an ESP-32 functions as both the processor 160c and the radio relay module 159c. In other exemplary implementations, other WiFi/processor module integrations may be used such as the Atmel (Microchip) ATSAMW25 integrated microcontroller/WiFi module. The figure illustrates the module 116c integrating the radio relay 159c and processor 160c components. The advantages of using the integrated processor/WiFi transceiver alluded to above are now clear. The WiFi relay functionality can be added to the RF direct hardware with no change in hardware.

In an exemplary embodiment of the WiFi relay implementation, when client 150c connects to RRRS/server 180c and accesses the server's IP address, an html/CSS/JavaScript file is executed by the client 150c allowing the RID data to be display using a common web browser running on the client 150c as was described above in connection with WiFi direct. Additionally, as in the WiFi direct mode, in exemplary embodiments of the WiFi relay implementation, the asynchronous server-sent events (SSE) or web sockets (WS) networking protocol is used to communicate data from the RRRS/server 180c to the client 150c depending on whether simplex (SSE) or duplex (WS) communication is used.

It should be stressed here again that the WiFi direct, RF direct, and radio relay modes are not mutually exclusive. The WiFi relay, WiFi direct, and RF direct modes may be implemented simultaneously (see FIG. 1d).

As with the RF direct mode, computer software instructions 112c in the SSCM 100c encode the RID data into the data structure for transmission by the communication module 130c to the RRRS 180c. Software 161c running in processor 160c reads the data packet from the RRRS downlink module 157c and parses the data into constituent components just as was described above in the RF direct mode. In an exemplary implementation, SSCM communication module 130c and RRRS downlink module 157c are LoRa® radios such as the RFM95HC LoRa® radio These parsed data components are then packaged into a data array for radio relay transmission as was described above in the WiFi direct implementation. As mentioned, in the exemplary WiFi implementation, radio relay module 159c is a WiFi transceiver integrated with processor 160c, and the packets are transmitted from the RRRD/server 180c using the WiFi protocol. The packets are transmitted to a WiFi enabled receiver/display client 150c, where the packet is decoded and displayed in the same manner as described above in the WiFi direct mode.

In the WiFi relay implementation, WiFi enabled remote receiver/display device (RRDD) 150c (e.g. smartphone) functions as a client receiving and displaying the remote ID data transmitted by the RRRS/server 180c. The remote ID broadcast system is designed such that minimal to no modifications are required to the receiver/display devices (RRDD) 150c to perform the HMI functions. As mentioned, remote receiver/display devices (RRDD) 150c may be realized as commercial off the shelf WiFi enabled devices such as laptops, tablet computers, PDAs, smartwatches, or smartphones, utilizing a common web browser executing the html/JavaScript code provided by the server 180c, to display the RID data.

The SSCM 100c and remote receiver/relay system 180c may include remote ID data recorders 125 and 125b respectively, for recording vehicle mission remote ID data. The recorded remote ID data may then be analyzed post-flight to accomplish various purposes such as liability mitigation, evidence of regulatory compliance, or just virtual recreation of the flight. One difference between recorders 125 and 125b are that former is recording data at the source whereas the latter is recording data which is received at the ground. As described above, in connection with FIG. 1B, an integrated module 115c may comprise the SSCM processor 110c and WiFi 111c components. In an exemplary implementation, an ESP-32 module integrates the two components into a single module. As was stated before, the integrated module may be used even if WiFi functionality in the SSCM is not used, by simply turning OFF the WiFi functionality.

The individual modes though described separately may in fact be implemented simultaneously or in various combinations. The system illustrated in FIG. 1d is an amalgam of the three previously described modes. The hardware includes all of the components described in the previous three modes and the software combines functions present in each of the three modes. Thus, software code 112d not only outputs the RID data to the WiFi transceiver 111d, it also outputs it to the RF transceiver radio 130d on WiFi path 199a and RF path 199b to receivers 150a and RRRS 180d respectively. WiFi enabled remote receiver/display 150a then displays the RID data as was described in the WiFi direct mode.

RRRS software 161d takes the RID data received by the RF transceiver 157d and parses it for wireless transmission to remote receiver/display 150d and to LCD display 190 and/or by wired connection to display 150b. As was the case for the above modes, in exemplary embodiments radios 130b and 157d are LoRa® radios and wireless transmission 199b utilizes LoRa® modulation. Also in exemplary embodiments, radio relay module 159d and remote receiver 150d are WiFi enabled, and wireless relay 155d utilizes WiFi. Further, as was described in previous modes, integrated modules 115d and 116d may comprise integrated processor and WiFi functions 110d/111d and 160d/159d respectively. In exemplary embodiments the integrated modules 115d/116d may be realized with ESP-32 or alternatively ATSAMW25 integrated microcontroller/WiFi modules.

Figure 2:
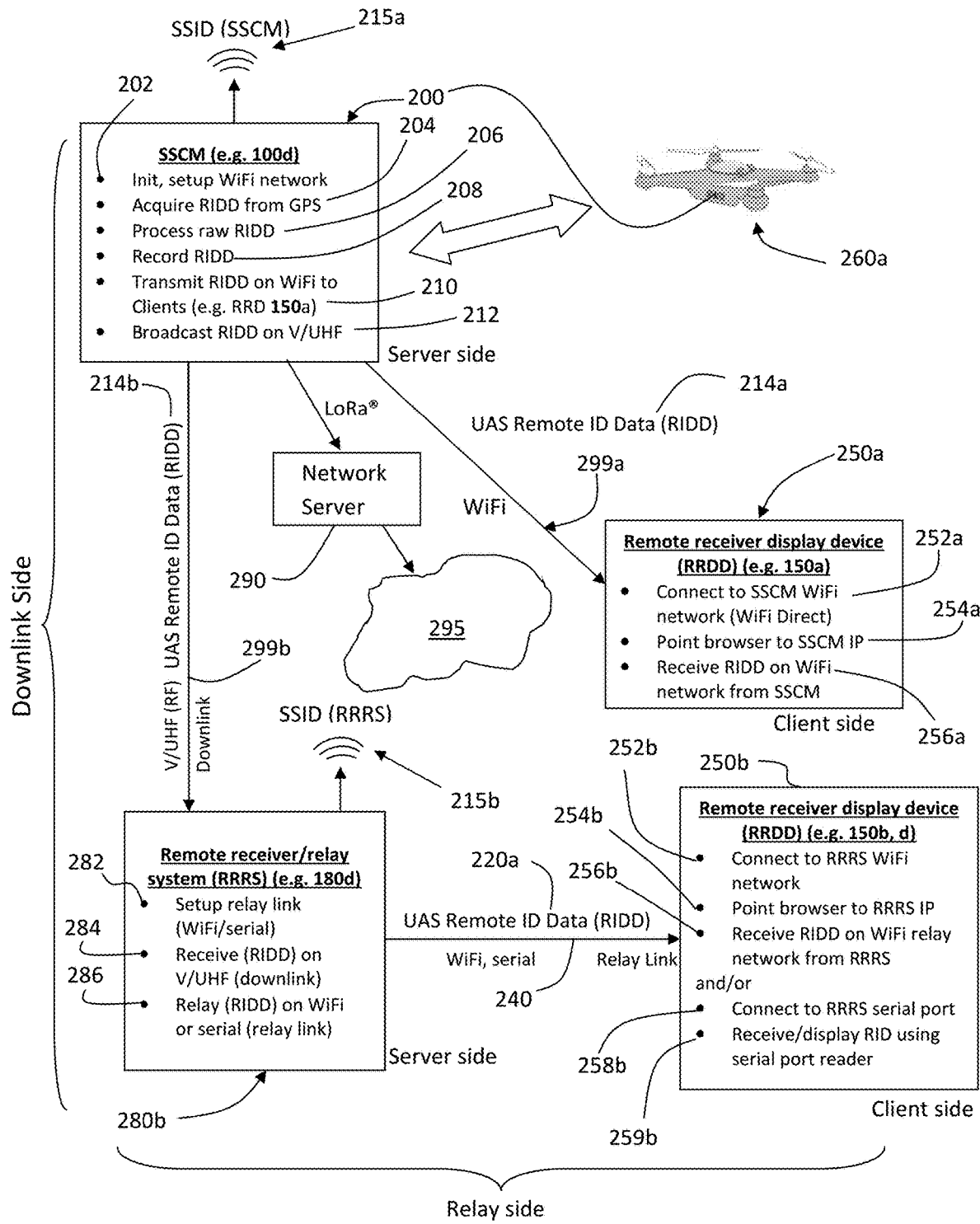
FIG. 2 represents possible data flows contemplated by the present invention for operating modes of the invention.

FIG. 2 illustrates the data flows in the various modes described above. Block 200 indicates the top level activities executed by the SSCM 100a-d; block 280b indicates the top level activities executed by the RRRS (180b-d); block 250a indicates the top level activities executed by the WiFi enabled RRDD 150a; and block 250b indicates the top level activities executed by the by the WiFi enabled RRDD 150c-d. Data flow descriptions will be given in the context of the 'full-up' mode (FIG. 1d), where all modes are active, and in the context of the exemplary embodiments described above, where wireless connection 299a is WiFi, wireless connection 299b is a LoRa® signal, and wired/wireless connections 240 are serial and WiFi.

Initially, the SSCM performs initialization tasks including, setting up 202 a WiFi direct network 299a for communicating with clients 250a (e.g. remote receiver/display device 150a). The remote ID data (RIDD) is acquired 204 and processed 206. After processing of the remote ID data is complete, the processed remote ID data (RIDD) may be recorded 208 with the recording module (125a FIG. 1d) and transmitted 210 on the WiFi direct network 299a to clients 250a. The remote ID data (RIDD) is also broadcast 212 to the remote receiver/relay system (RRRS) 280b using the RF 'downlink' communication protocol 299b for display or relay to more distant clients 250b. The term 'downlink' will be used to refer to the communication link 299b from the SSCM 200 to the RRRS 280b. 'Relay-link protocol' 240 will be used to describe the communication link 240 between the RRRS 280b and the RRDD 250b.

In the case of the WiFi direct, the remote receiver/display device RRDD 250a, functioning as a client, connects 252a to the SSCM WiFi network 299a and points its browser 254a to the SSCM/server 200 IP address, whereby the remote ID data is received and displayed 256a as described above.

The remote receiver/relay system (RRRS) 280b establishes 282 a link with wired/wireless clients. In exemplary implementations, the wired and wireless relay links utilize serial ('serial relay') and WiFi ('WiFi relay') protocols respectively. The RRRS 280b then receives and processes the RIDD 284 and relays 286 the data to wired or wireless clients.

In the case of the WiFi relay, the remote receiver/display device RRDD 250b, functioning as a client, connects 252b to the RRRS WiFi network and points its browser 254b to the RRRS/server 280b IP address, whereby the remote ID data is received and displayed 256b as described above. In the case of the RF direct/wired relay, a terminal emulation or similar program running in the display device 250b connects to the device serial port 258b and reads/displays the incoming serial data 259b.

As described above, in addition to broadcasting the remote ID data 214a and 220a to connected clients, the SSCM 200 and RRRS 280b servers, broadcast network service set identification (SSIDs) 215a and 215b respectively, containing UAS identification badge information, to any WiFi enabled device, regardless of whether it is connected to the respective network. Further information regarding the SSID and its significance are discussed below in connection with FIGS. 6a-c.

The SSCM 200a may also act as an LoRaWAN® internet gateway, connecting to internet network servers 290 such as the LORIOT or The Things Network, allowing the RID data to be made available in the internet 295 and thus making the RID data available worldwide.

Figure 3A:
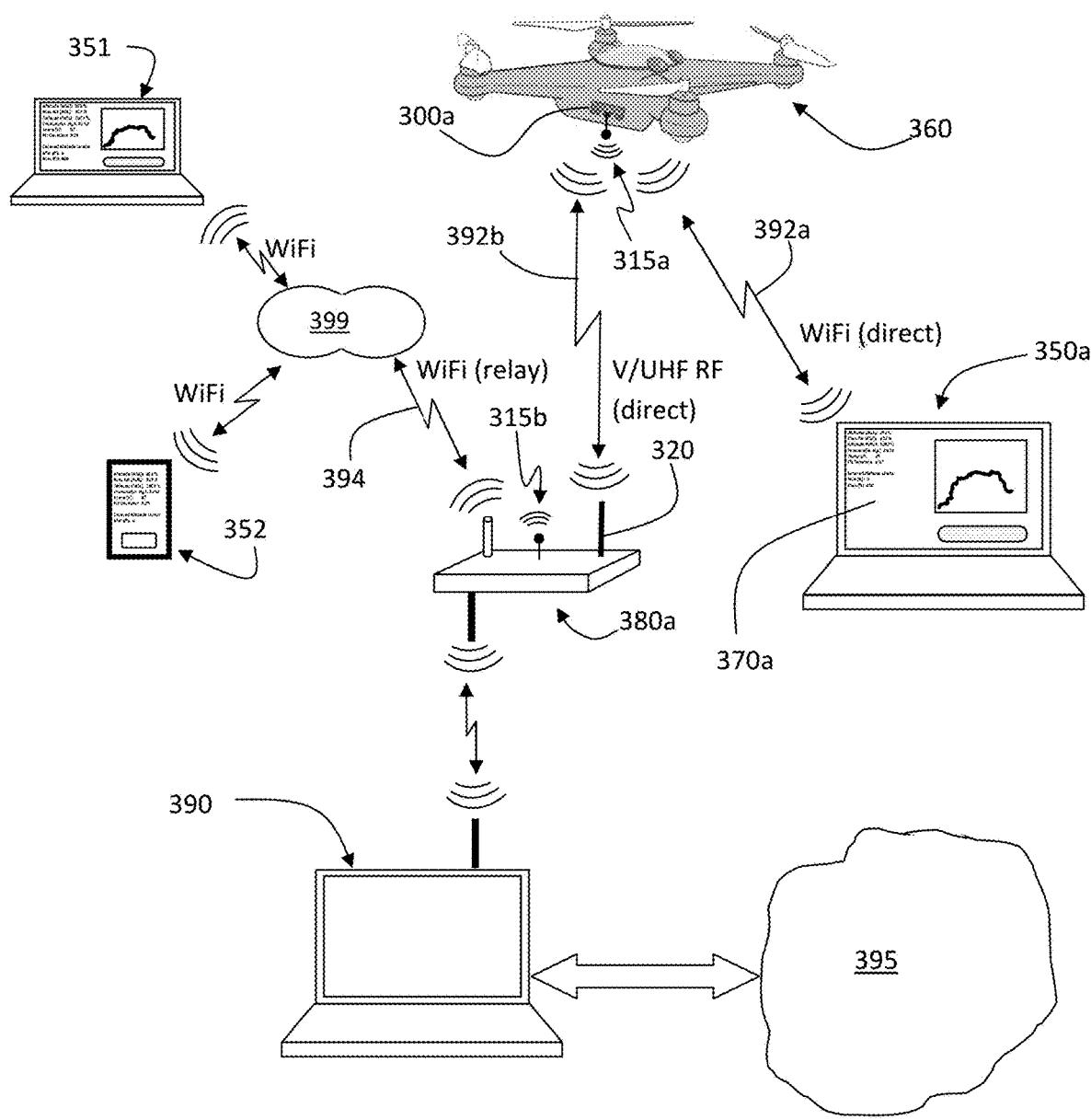
FIGS. 3a-3d illustrate various wired and wireless connections of the remote ID broadcast function system and method of the invention.

FIGS. 3a-3d illustrate the communication paths in various modes of the remote ID broadcast module implementation. In FIG. 3a, the SSCM 300a communicates directly with remote receiver/display device (RRDD) 350a (the 'WiFi direct' mode) and indirectly (WiFi relay mode) with RRDDs 351 and 352 through the remote receiver/relay system (RRRS) 380a, acting to relay the received RID data. In an illustrative embodiment, SSCM 300a may be attached to airborne UAS 360, wirelessly transmitting remote ID data to remote receivers. In a first instance, a 'near' client 350a is sufficiently close to the UAS 360/SSCM 300a that WiFi direct communication of the remote ID data between the SSCM 300a and the client 350a via WiFi path 392a is possible. For users who are too far from the SSCM transmitter 300a for WiFi direct communication, the RF direct and radio relay modes may be used.

In the RF direct and radio relay modes, the SSCM 300a communicates the UAS remote ID data to a remote receiver/relay system 380a using a long range RF communication protocol 392b. Once the RID data has been communicated to the receiver/relay 380a, it can then be relayed wirelessly to receivers 351, 352 (FIG. 3a) or to physically connected devices (FIGS. 3b and 3c) or displayed internally (310 FIG. 3b). In exemplary embodiments, the long range communication protocol 392b utilizes the LoRa® spread spectrum modulation technology, and the wireless relay 394 utilizes WiFi protocol.

In this exemplary implementation, the remote receiver/relay system 380a may receive the V/UHF signal 392b from the SSCM 300a directly and establish a WiFi relay network 399 to which remote receiver/display devices (RRDD) 351 and 352 may connect as described above. The remote receiver/relay device 380a may further comprise a processing module and downlink receiver to receive the transmitted RIDD. The processor module may comprise an integrated processor/WiFi transmitter SoC module to establish the relay network 399. As discussed above, in an exemplary embodiment, the downlink receiver is a LoRa® radio, and the processor/WiFi transmitter SoC module is realized in an ESPRESSIF ESP-32 module. In another embodiment, the integrated processor/WiFi transmitter module is realized in an Atmel (Microchip) ATSAMW25 integrated microcontroller/WiFi module. Note that in addition to broadcasting the remote ID data to connected clients, the SSCM 300a and RRRS 380a broadcast network SSIDs 315a and 315b which may contain UAS identification badge information, available to any WiFi enabled device, regardless of whether it is connected to the respective network. The RRRS 380a may also act as an LoRaWAN® internet gateway, connecting to internet network servers 390 allowing the RID data to be made available in the internet 395 and thus making the RID data available worldwide.

Figure 3B:
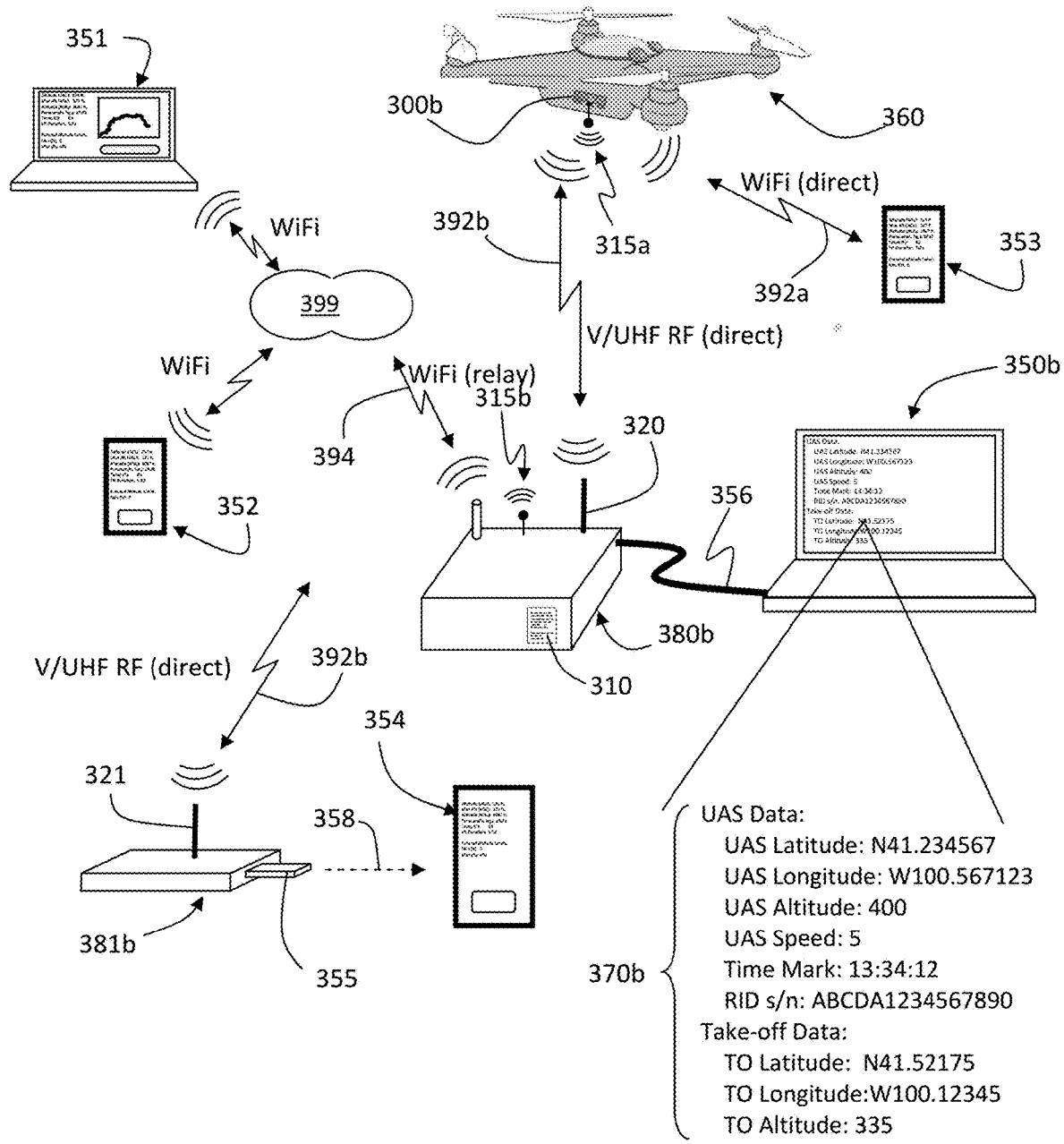

FIG. 3b illustrates a couple of additional implementations of the remote receiver/relay and its interface to a receiver/display. One such implementation is where the remote receiver/relay 381b is integrated into a USB 'fob' or 'dongle,' including an antenna 321 for receiving the V/UHF RF signal 392*b*. Such a receiver 381*b* could comprise a connector 355 allowing the receiver 381*b* to be plugged 358 directly into a receptacle on receiver/display 354. A wired relay is represented by the wired 356 connection of a display 350*b* to the receiver/relay system 380*b*. As was discussed above, the received RID data might be transferred to the 'wired' receivers 350*b*/354 using the serial protocol which could be read and displayed by any number of serial emulator applications such as PuTTY, Termux, SerialBot, ConnectBot and others, or perhaps a specifically designed software application. In another implementation, an integrated display 310, such as an LCD, is integrated as part of the remote receiver/relay 380*b*, allowing the display of the RID data with a separate internal display 310. The WiFi direct and wireless (WiFi) relay modes are represented by receiver/displays 353 and 351, 352 respectively. Note that a single remote receiver/relay 380*b* may support internal display 310, both wired receiver/displays (350*b*), as well as wireless (e.g. WiFi relay) connected receiver/displays (351, 352) simultaneously.

Figure 3C:
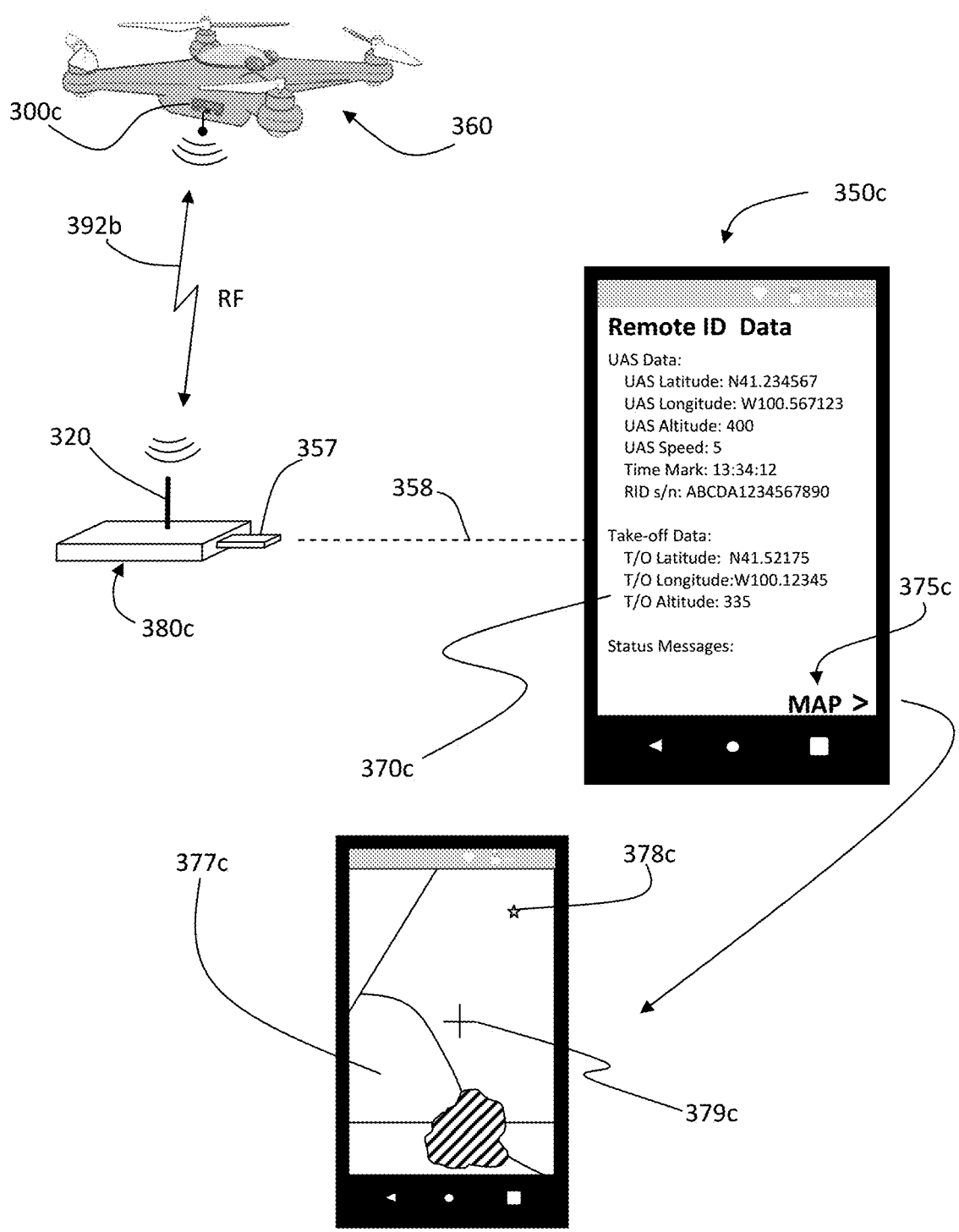

FIG. 3*c* illustrates another 'wired' relay mode implementation with the receiver/relay device 380*c* being directly physically connected to the display device 350*c* such as a laptop, smartphone, or other display device. The receiver/relay 380*c* is receiving RID data from SSCM 300*c* via V/UHF signal 392*b*. In an exemplary implementation, the receiver/relay device 380*c* comprises a serial connector plug 357 which may be directly inserted into a corresponding serial connector socket (not shown) on the display device 350*c*. As mentioned in connection with FIG. 3*b*, an application such as a serial emulator, might be running on the display device 350*c* which would allow for the reading and display of the remote ID data available on the serial input port. Alternatively, a dedicated application might be used. The form factor of connector 357 would depend on the corresponding connector on the receiving device 350*c*. For example, smartphones and other portable smart devices frequently have a micro B USB port. In that case, connector 357 might be a Micro B plug. Unfortunately, not all display devices utilize this form factor. For example, laptops, depending on vintage, frequently utilize Type A USB connectors. Fortunately, adapter connectors are readily available. FIG. 3*c* also illustrates the concept of a moving map used to graphically display 377*c* the position of the UAS 378*c* based on the RID data received from the UAS and the known position of the receiving device 350*c*. The map might be accessed 375*c* from the main display 370*c* of the RID data.

Figure 3D:
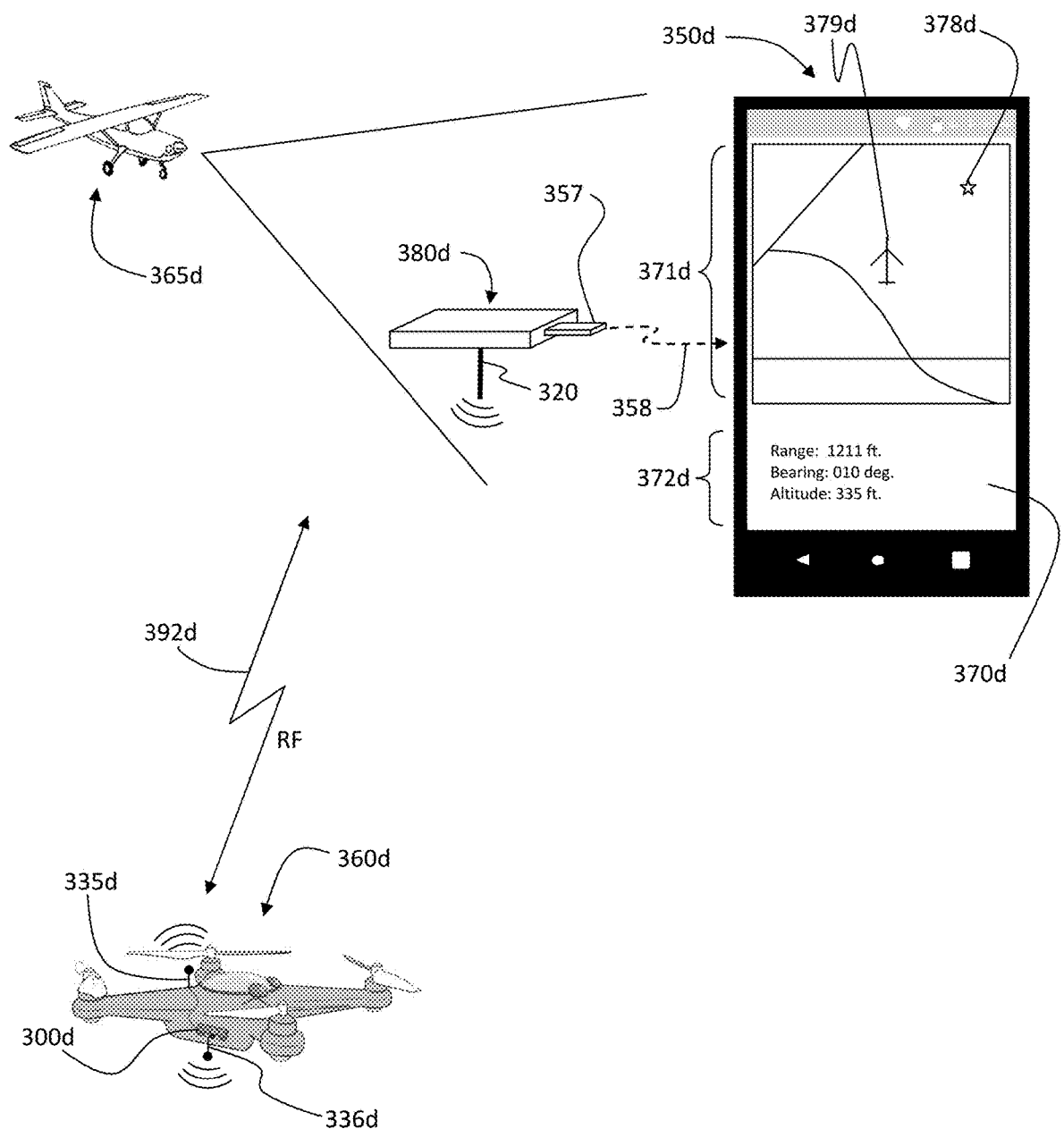

FIG. 3*d* illustrates the use of the invention in a manned aircraft 365*d* as an aid to avoid airborne UAS 360*d*. The implementation is similar to that in FIG. 3*c* except that a cockpit display 350*d* is used to display UAS data 370*d*. Various implementations might include a map 371*d* to provide a pictorial representation of the aircraft 379*d*/UAS 378*d* relative positions. Also, quantitative relative position information 372*d* of the aircraft/UAS may be provided such as relative bearing, range and altitude. The standard RID data discussed in other figures may also be provided on user selectable screens.

The cockpit display 350*d* and associated receiver 380*d* would be positioned in the cockpit for display to the pilot. The system might be permanently mounted or more likely carried onto the aircraft for a temporary mounting. As was discussed in FIG. 3*c*, the receiver 380*d* might be of a form factor allowing for a direct physical connection to the display 350*d* such as by USB connectors. The UAS SSCM 300*d* would be identical to those described above and would include V/UHF RF broadcast 392*d* of the RID data. The UAS installation may include an antenna 335*d* positioned on top of the UAS 360*d* to facilitate transmission of the RF 392*d* signals to airborne receivers 380*d*. The receiver 380*d* would be substantially identical to those discussed with at least RF direct receiving capability. The receiver 380*d*, display 350*d*, or external source (not shown) may provide GPS position of the manned aircraft 365*d*. Processors and software within the display 350*d* would then have the data necessary to perform the relative position calculations necessary to provide the graphical 371*d* and textual 372*d* displays of data. The mapping function might utilize an internally stored map or may utilize an internet connection to interface with an external mapping application such as GOOGLE MAPS.

Figures 4A, 4B:
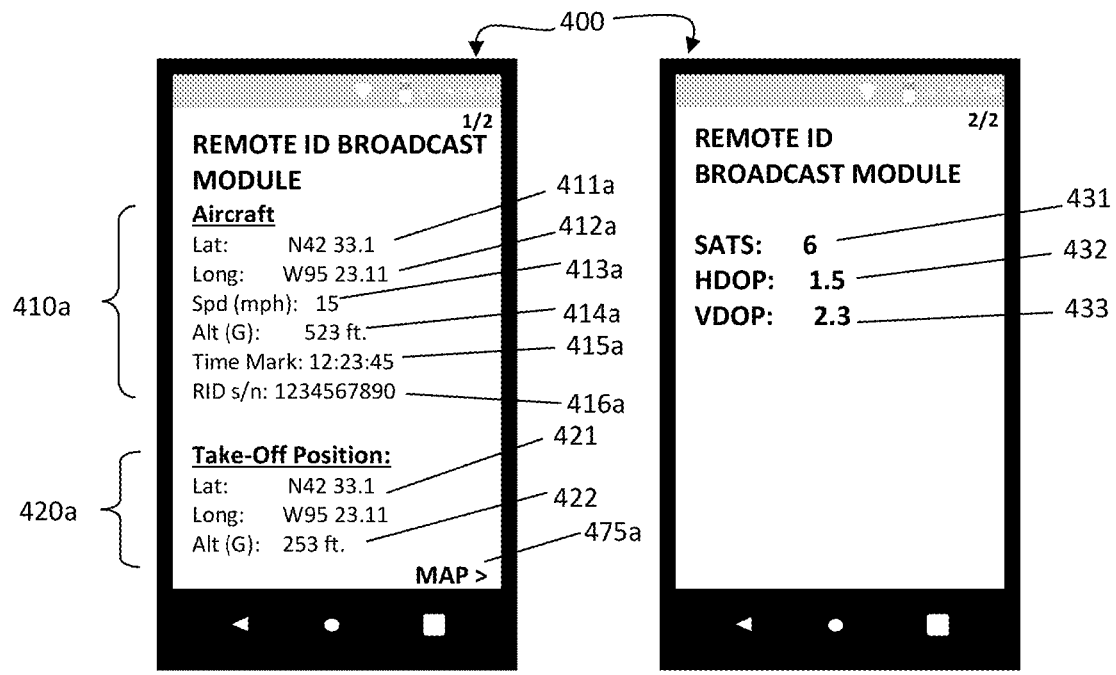
FIGS. 4a-4h illustrate some graphical user interface (GUI) screen shots as they might appear on a remote receiver/display device (RRDD) implementing the present invention.
Figures 4C, 4D:
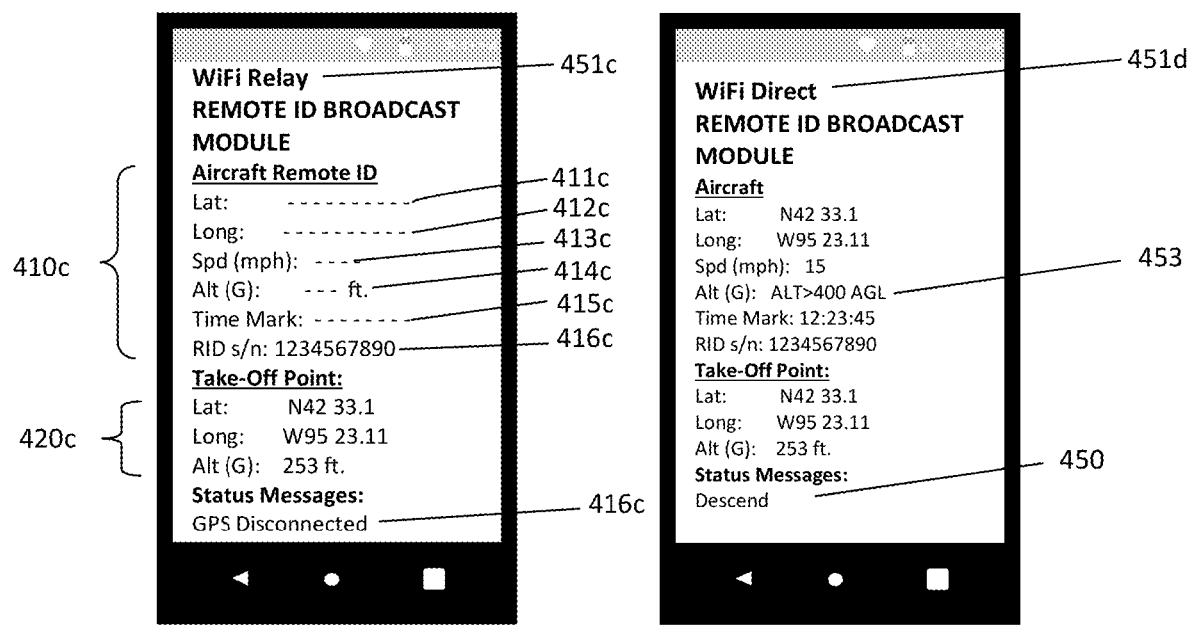
Figures 4E, 4F:
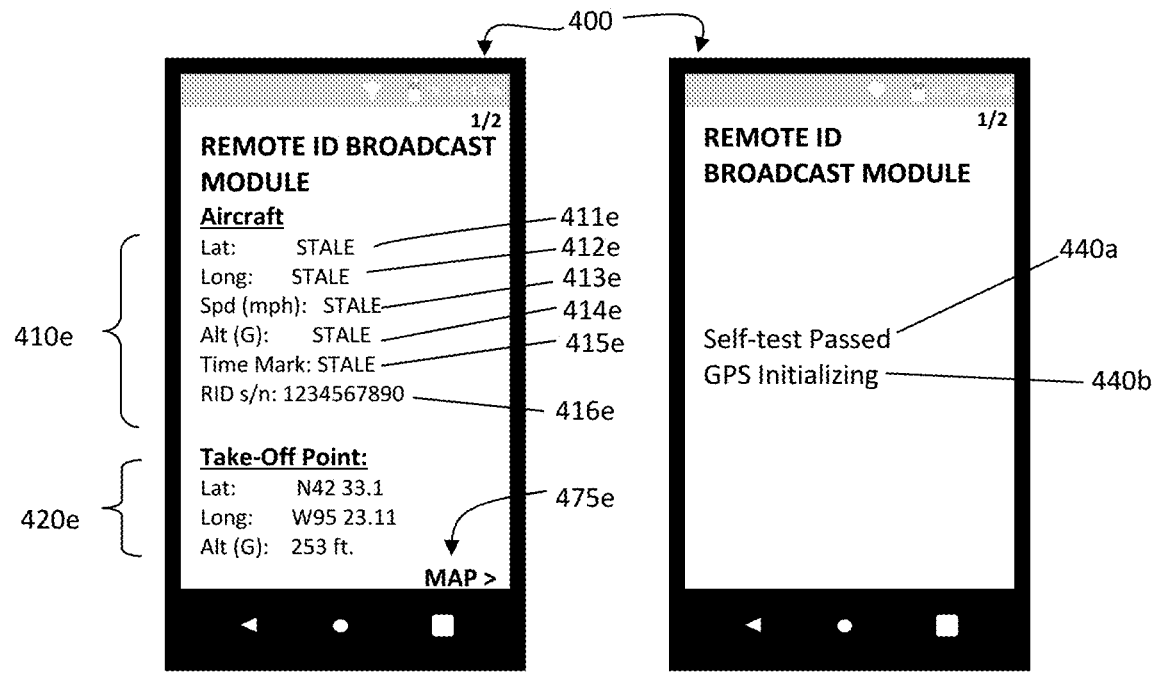

FIGS. 4*a-h* illustrate possible exemplary graphical user interfaces (GUIs) pages displayed on an RRDD (e.g. 150*a* FIG. 1*a*). It will be understood that there are many arrangements possible for the display of the data, and the appearance or 'look and feel' of the display pages shown are just a few examples and may be altered or added to without distracting from the teachings of the invention. FIGS. 5*a*-5*d* illustrate the operation of software code executing in the SSCM and RRRS. Specifically, FIGS. 5*a*-5*c* illustrate software logic flow executed by the software code 112*a-d* on the SSCM (100 FIG. 1) for the WiFi direct, RF, and WiFi relay modes, respectively.

The client display of RID data will include a display of the UAS flight data 410*a* and the take-off data 420*a* (FIG. 4*a*) as required by the FAA regulations. The 'page' displayed in FIG. 4*a* is sometimes referred to as the remote ID web page or RID page in this specification. The UAS flight data 410*a* is mandated to include UAS position 411*a*, 412*a*, speed 413*a*, geometric altitude 414*a*, a time mark 415*a*, and the remote ID module serial number 416*a*. The take-off data 420*a* includes the take-off point latitude/longitude 421 and geometric altitude 422. As discussed above, the current UAS flight data 410*a* is periodically updated by 'reading' the GPS sensor to retrieve the latest UAS position, speed, altitude and time of fix. The take-off data 420*a*, is determined after power-up initialization and self-test and is stored in program defined data elements for periodic retrieval. Once determined, the take-off data will not be re-evaluated until the RID system power is recycled or occurrence of some other program determined event, e.g. another transition to take-off. In addition to the textual display of data, the page may include a map page access 475*a* proving page access to a graphical map showing the UAS position (see FIG. 3*c*). A second page (FIG. 4*b*) may be included showing some sensor statistics such as GPS number of satellites tracked 431, and horizontal and vertical Dilution of Precision, HDOP 432 and VDOP 433 respectively, as just a few examples.

In addition to the nominal display of the data as shown in FIG. 4*a*, *b*, there may be additional display formats, warnings, or alerts which are active under specific circumstances. For example, a status message field 416*c* (FIG. 4*c*) may be shown relaying any status messages received from the SSCM server, or based on conditions determined by the client. In the illustrated example, the GPS data is not available, resulting in the UAS flight data display fields replaced with 'dashes' (411*c*-415*c*; FIG. 4*c*) to alert the pilot/operator that the data is no longer available. Similarly, if the data is flagged invalid, the data may be dashed. Note that in this particular scenario, the take-off data 420*c* is unaffected since it was previously determined and is stored in program variables and is constant during the flight, i.e.

does not require periodic GPS updates. Note also that an explicit alert, i.e. 'GPS Disconnected,' may also be displayed in the Status Message field 416c if the GPS cannot be detected.

An indicator may be provided on the display page indicating the network or source of the data displayed 451c, d. This indicator might indicate "WiFi direct' 451d when connected to the SSCM WiFi direct network 199a; 'RF direct' if connected to the RRRS RF direct serial output 156; or 'WiFi relay' 451c when connected to the RRRS WiFi network 155.

The system may also include flight generated alerts for the pilot. One such example is when the UAS exceeds the legal 400 foot AGL limit imposed by federal regulations (14 CFR § 105.51). As was mentioned above, in one exemplary implementation, the remote ID broadcast module will attempt to estimate the UAS AGL altitude by comparing the current GPS altitude with that measured when the UAS was on the ground prior to take-off (i.e. zero AGL bias altitude (ZABA)). Should that estimate exceed 400 feet (or some reasonable allowance) an alert may be raised (450 FIG. 4d), indicating the exceedance. The actual altitude may be masked (453 FIG. 4d) to discourage pilots from 'seeing how high they can get.' Other alerts or warning displays might be for situations where the GPS is connected but one or more pieces of data become 'stale' due to an extraordinary amount of time elapsed since the last data update (411e-415e; FIG. 4e). Note that the UAS remote ID broadcast module serial number 416e and take-off data 420e are constants and thus not subject to 'staleness' checks. Another alerting example might be a 'start-up' page displayed to alert the pilot that the system has passed its self-test (440a FIG. 4f) but is still initializing the GPS (440b FIG. 40, or the start-up self-test has failed (445 FIG. 4g). Alternatively, these statuses may be displayed in the status message field, e.g. 416c FIG. 4c.

Figures 4G, 4H:
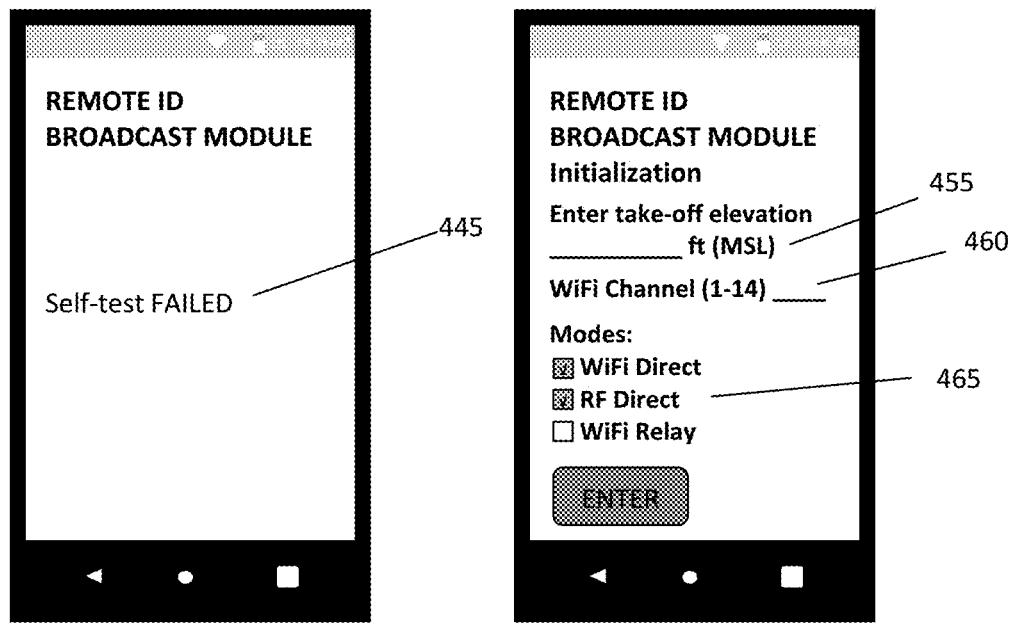
Figure 5A:
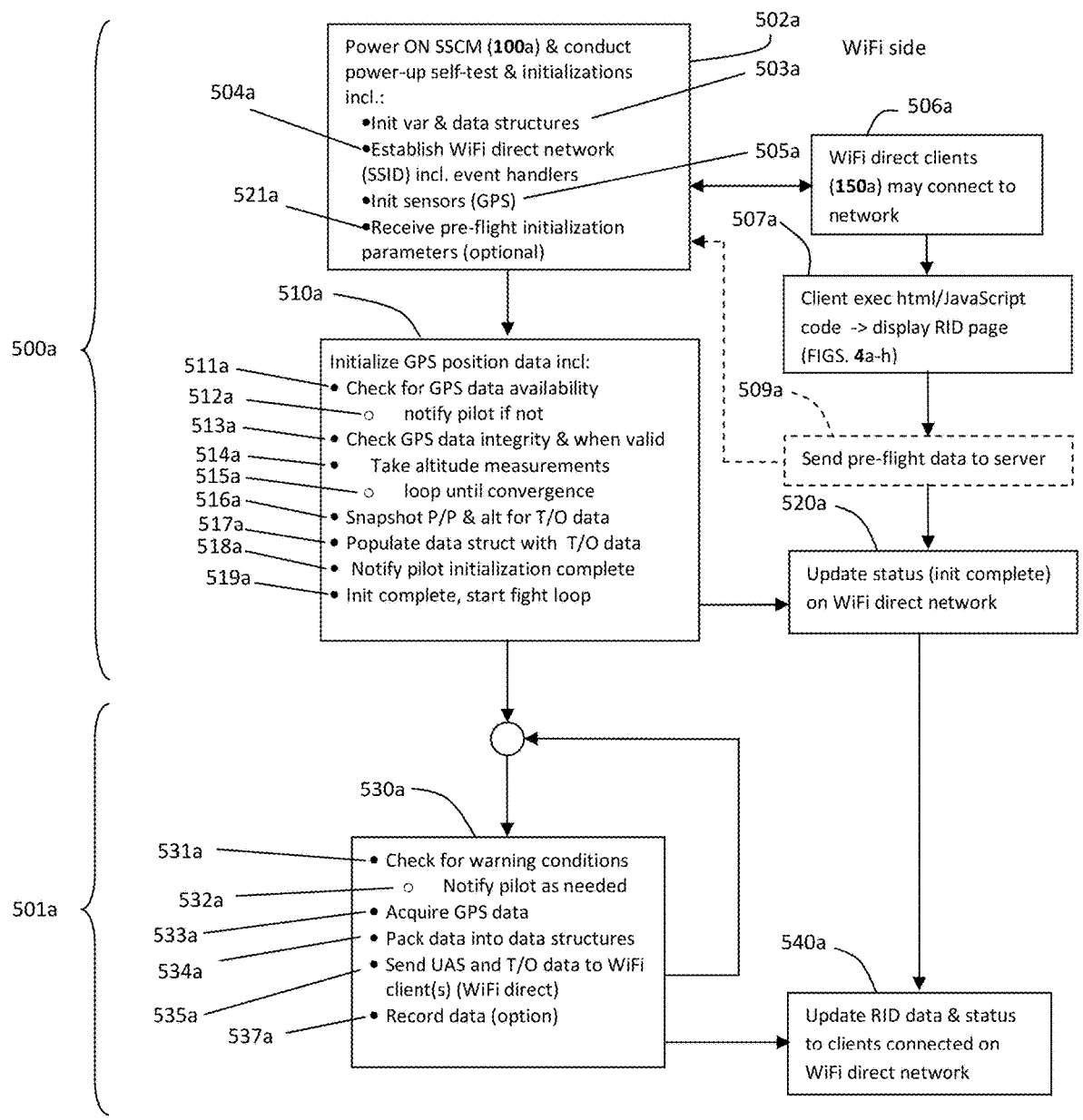
FIGS. 5a-5c illustrates exemplary software logic flows executed by the airborne sensor suite/communication module (SSCM) software code in the WiFi direct, RF direct, and radio relay modes respectively.
Figure 5B:
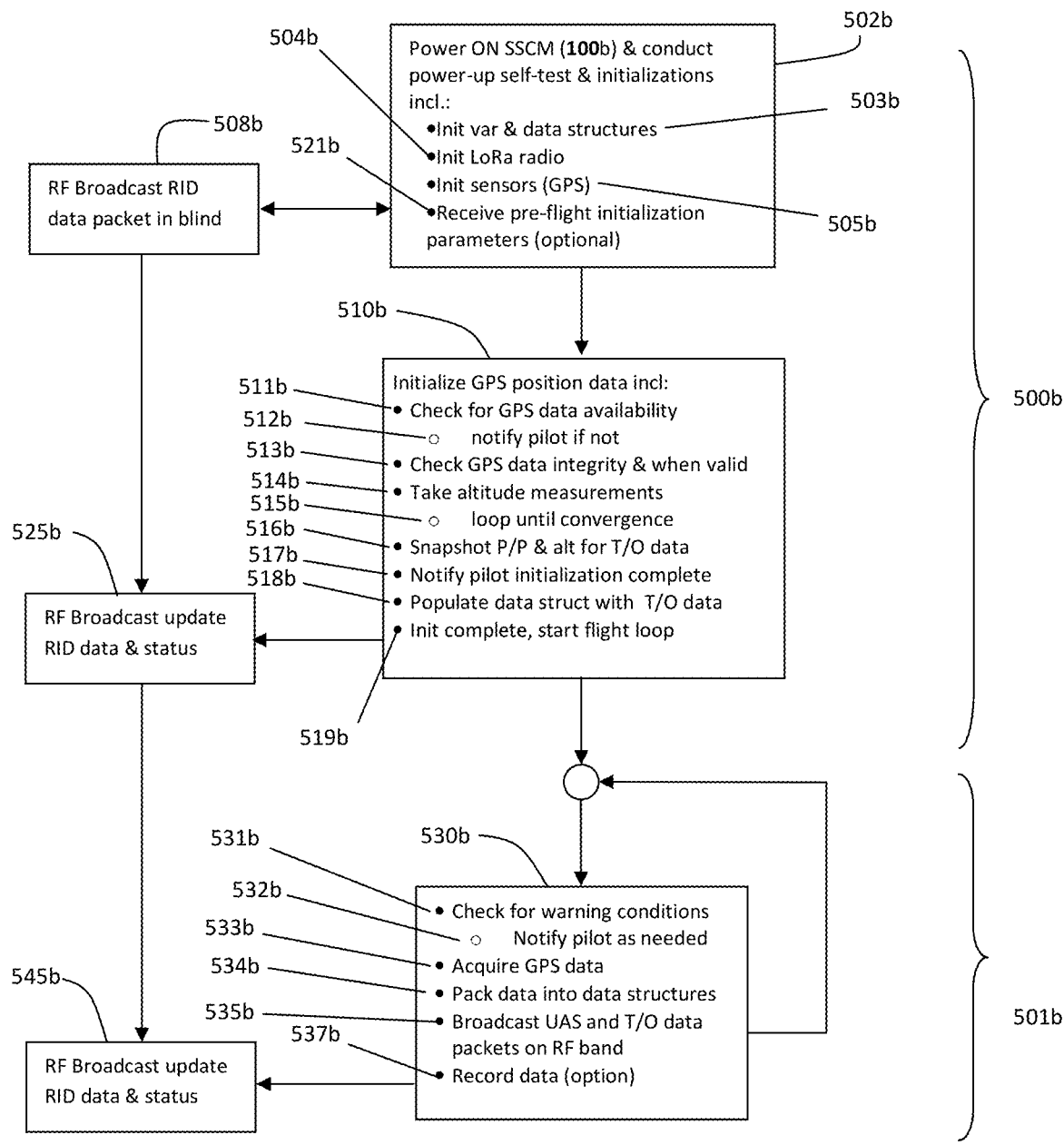
Figure 5C:
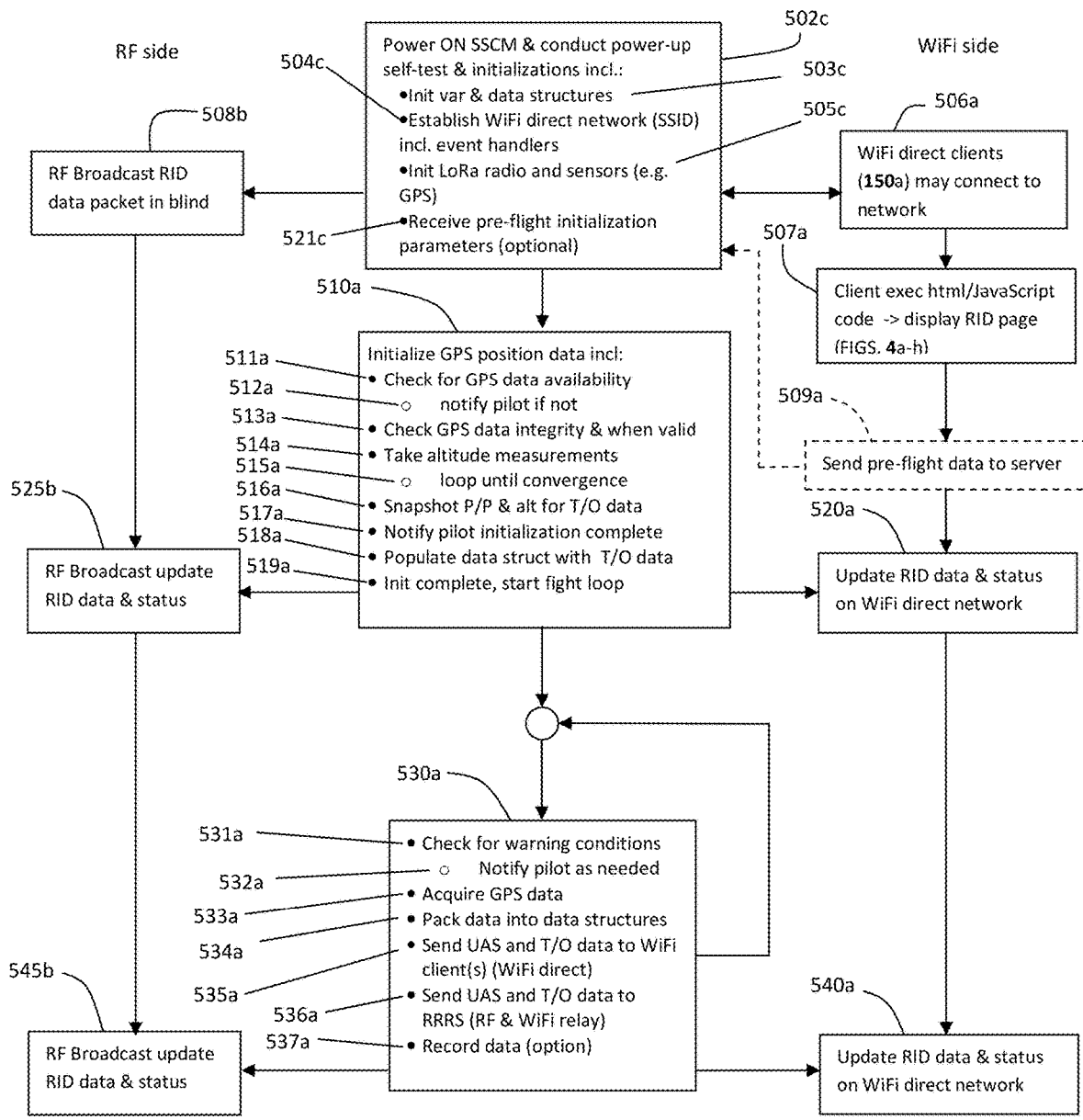

FIG. 4h illustrates an example of a pre-flight initialization operator interface. In this example, the operator is asked to enter a known field elevation 455 of the take-off location for use during the initialization process. Other possible operator enterable pre-flight initialization items include WiFi channel 460 and operating modes 465. Some parameters may have initialization defaults. Pre-flight initialization was discussed above in the context of the exemplary implementation of the interface between the server and client. As was pointed out, in exemplary embodiments, when the communication is unidirectional server to client, the server-sent events networking protocol is used, but when bidirectional communication between server and client is required, such as for exchange of pre-flight settings, the web sockets implementation may be used.

The display of the various page configurations and the data displayed thereon are controlled in the WiFi direct mode by the execution of SSCM 100a software 112a and the html/JavaScript code executed in the client 150a, and in the RF direct and WiFi relay modes, by software 112b-d and 161b-d and the html/JavaScript code executed in the client 150c. The logic flow of the software execution is illustrated in FIGS. 5a-d.

Starting first with operation of the SSCM software 112a in the WiFi direct mode illustrated in FIG. 5a, the software logic may be broadly broken into two subcomponents, the 'ground loop' 500a and the 'flight loop' 501a. The ground loop 500a includes the self test and initialization which occurs at start-up, with the UAS positioned in the take-off position, usually on or near the ground. The flight loop 501a executes immediately following the completion of the ground loop initialization tasks 510a. Thus, despite its name, the flight loop 501a may execute on the ground as well as during flight. When the SSCM module 100a is initially powered 502a, it conducts a self-test/initialization such as checking sensor availability, defining data arrays, initializing variables, and setting sensor control variables 503a. The initialization also establishes the WiFi direct network 504a used to communicate with 'near' RRRD clients 150a. As part of the WiFi function initialization, the web server event handlers are defined 504a. (Recall that in an exemplary embodiment, the server-sent event client/server networking protocol is used).

As part of establishing the WiFi network, the SSCM transmits the SSID 504a as specified in the WiFi protocol. As was mentioned above, the SSID may be used to convey information as well, beyond just providing a network ID. In exemplary embodiments, the SSID is used to identify the network as belonging to a drone and to display the IP address necessary for a client to connect to the network. This approach facilitates the purposes of the remote ID regulations by enabling easy access to the remote ID data to anyone within range of the network and having a WiFi enabled device, even without actually connecting to the network.

Any time after the network has been established 504a, a client may connect 506a to the SSCM module 100a. As was mentioned above, in an exemplary embodiment, the SSCM WiFi network is configured with the SSCM 100a as a 'soft' Access Point and as a server sending RID data to RRDD clients 150a. Those skilled in the art will recognize that there are numerous networking protocols for managing the communication between server and client. One example discussed above was Asynchronous JavaScript and XML or AJAX. In this method, the browser may request data from the server based on events such as a time interval, thereby permitting automatic updating of the displayed page. Data may be sent to the page in many different formats with JSON (JavaScript Object Notation) being a common one. Upon occurrence of the defined event, the browser creates an XMLHTTP request to the server which responds by sending the specified data back to the browser/client for display in the web page. Another technique is Server Sent Events (SSE). This is a one way communication from the server to the client based on the occurrence of an event triggered in the server. Upon occurrence, a specified set of data is sent to the client for display on a web page by the browser. A third example was the web sockets protocol which is similar to serve-sent event but allows two way communication between the server and the client. As mentioned, in a first exemplary embodiment, server-sent events networking is used for unidirectional (server->client) communications. In a second exemplary embodiment, web sockets networking is used where bidirectional (sever<->client) communications are needed such as sending operator entered data to the SSCM during initialization.

As another part of the start-up, the flight data sensors 505a are initialized. Recall that at a minimum, a GPS sensor is used to acquire the FAA required flight data including position, speed, and altitude. GPS sensor initialization is sensor specific but in the case of the exemplary embodiments, utilizing u-blox sensors, it includes selecting the sensor output format and the update frequency.

As described above, once the WiFi network is established, a client may 'log on' 506a using the server's (i.e. SSCM module 100a) IP address (listed in the network SSID) upon which the html/CSS/JavaScript code reading/parsing/displaying the RID data is executed 507a to display data received from the server. In the embodiment where the operator provides pre-flight initialization, the operator may send pre-flight configuration setting/data 509a after the client has connected to the network. The server may then receive and process the pre-flight settings 521a. Finally, as part of the 'ground loop' 500a, the take-off position data is acquired 510a.

Take-off data acquisition 510a includes verifying GPS data availability 511a and validity 513a. If the GPS data is not available (e.g. GPS is disconnected or inoperative), the pilot is notified 512a via the statusing methods described above. Once the GPS data is available, the code begins the process of determining the position (latitude and longitude) and altitude of the take-off spot. GPS position and altitude accuracy is dependent on a number of factors, not the least of which is satellite geometry. Specifically, during project testing, GPS altitude was found to take the longest to stabilize from a cold start. Thus, as part of the GPS initialization, particular scrutiny of GPS altitude measurements during start-up is applied. In one exemplary embodiment, once the position fix data is flagged as valid 513a, a series of altitude measurements are taken 514a and statistical methods applied to quantify measurement stability 515a. Once sufficient stability is achieved, a final measurement may be taken and defined as the take-off altitude 516a. What constitutes sufficient stability, i.e. how good is good enough, is subjective. The required stability value and the time it takes to get there must be balanced with the burden the time delay places on the pilot and his mission. In an exemplary embodiment, the altitude initialization continues until a mean convergence of +/−10 feet is achieved. In practice, this was achieved in under a minute.

Once the GPS altitude data has converged 515a, it along with the UAS position is captured 516a as the take-off data, the data structure is updated with the T/O data 517a, and the pilot is notified that initialization is complete 518a. At this point, the UAS is ready to initiate its mission and the software transitions 519a from the ground loop 500a to the flight loop 501a. (Note as mentioned, the 'flight loop' will be executed with the UAS on the ground until the pilot takes off). The updated status is made available to any connected clients through the networking connection discussed above 520a.

The flight loop 501a of the code is where the system spends the vast majority of its time. In one embodiment, the flight loop is comprised of instructions which are executed according to a particular schedule. The schedule is determined by the FAA regulations which require the RID data be updated at a rate of at least once per second. In an exemplary embodiment, the loop is executed every 500 ms. In another embodiment, the loop runs continuously (open loop). In yet another embodiment, the loop is divided into two components the inner loop and the outer loop. The timing of the inner loop is determined in accordance with FAA requirements, namely that the RID data be updated at least once per second. In an exemplary embodiment, the inner loop is scheduled to run every 500 ms. The outer loop runs continuously. In any embodiment, the software continuously checks for the GPS availability/validity 531a and notifies the pilot if data is not available or is invalid 532a.

The other tasks executed in the flight loop are the periodic reading of the GPS data 533a, packing the RID data into a data structure 534a and transmitting the data on the WiFi direct network 535a. The details of this process were discussed above. If a data recorder is installed on the SSCM, the flight data is periodically recorded 537a to a removable storage media or on-board memory. Using the networking connection discussed above, the UAS remote ID data is continuously updated to clients connected to the WiFi direct network 540a.

The flight loop executes until power is removed or a reset occurs. The software may include a reset handler to determine the cause of the reset, 'hard' (i.e. power) or 'soft' (i.e. software). If the reset was a soft reset, the system may attempt to recover using stored values of the take-off data until the pilot lands to assess the situation.

Figure 5D:
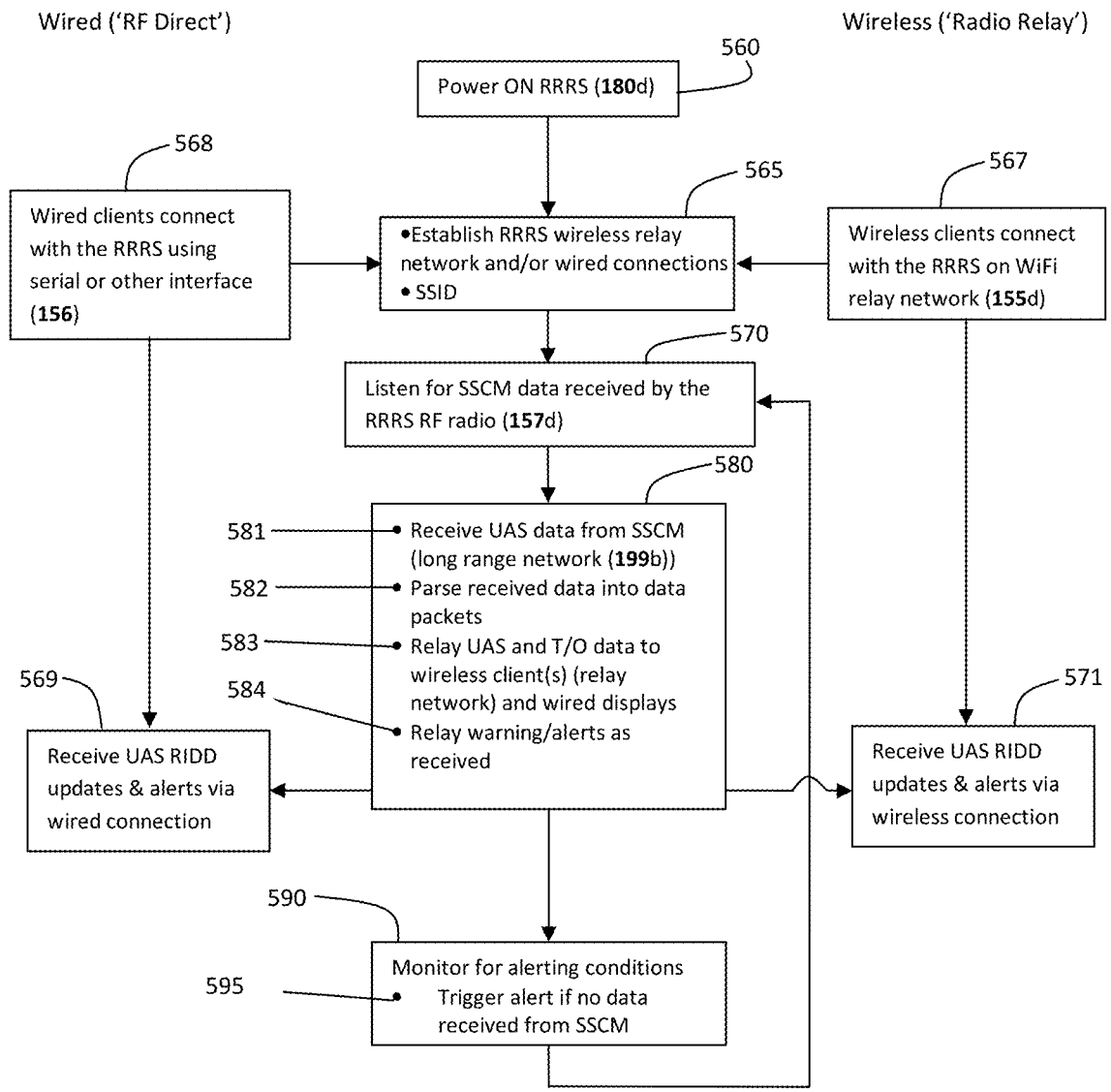
FIG. 5d illustrates exemplary software logic flows executed by the remote receiver/relay system (RRRS) code.

FIG. 5b illustrates the operation of the SSCM software 112b in the RF direct mode. Recall that in the RF direct mode (See FIG. 1B), operating software includes not only software 112b executing in the SSCM 100b but also software 161b executing in the remote receiver/relay system 180b. The operation of the RRRD software is shown in FIG. 5d. Much of the operation of the SSCM software discussed in connection with WiFi direct above, also holds for RF direct operations. Recall that the two modes are not mutually exclusive and may operate concurrently. In fact, in one embodiment, the pre-flight initialization parameters are received 521b from the pilot via the WiFi direct interface, even when the RF mode is used during flight. However, for simplicity, only the RF mode will be discussed in conjunction with the figure.

As was the case with the WiFi direct mode, the software logic may be broadly broken into two subcomponents: the 'ground loop' 500b and the 'flight loop' 501b. The ground loop 500a includes the self test and initialization which occurs at start-up, with the UAS positioned in the take-off position, usually on or near the ground. When the SSCM module 100b is initially powered 502b, it conducts a self-test/initialization such as checking sensor availability, defining data arrays, initializing variables, and setting sensor control variables 503b. The initialization also initializes the RF radio (e.g. V/UHF) 504b used for long range data transmission. As mentioned, in an exemplary embodiment, a LoRa® radio is utilized for the RF connection. In that implementation, the radio initialization may include setting the transmit power, setting the frequency, enabling the error detection function (Cyclic Redundancy Check), and setting the bandwidth and spread factors.

Flight data sensor initialization 505b is the same as that accomplished with the WiFi direct mode discussed above. The SSCM may also receive and enter pre-flight initialization parameters 521b if that function is implemented. This may be acquired from either the RF interface or via the WiFi direct interface, as discussed above. The initialization status would be broadcast 'in the blind' to any compatible RF receivers 508b. The take-off position data acquisition 510b, including GPS data initialization sequence, is the same as that described above.

Once the GPS altitude data has converged 515b, it along with the UAS position is snapshot 516a as the take-off data, the data structure is updated with the T/O data 518b, and the pilot notified that initialization is complete 517b. At this point, the UAS is ready to initiate its mission, and the software transitions 519b from the ground loop 500b to the flight loop 501b. (Note that as above, the 'flight loop' is executed, for at least a small time, with the UAS on the ground). The updated status is broadcast in the blind and may be received on any compatible RF receivers 525b.

As above, the code flight loop 501b is where the system spends the vast majority of its time. The flight loop may be implemented using one of the designs discussed in the WiFi direct mode. In any loop implementation, the software continuously checks for the warning conditions 531b and notifies the pilot 532b.

The other tasks executed in the flight loop are the periodic reading of the GPS data 533*b*, packing the RID data into a data structure 534*b* and transmitting the data packets on the RF band 535*b*. The details of this process were discussed above. The remote ID data is broadcast into the blind, i.e. without regard for whether any receivers are listening. The operation of the RRRS 180*b* is discussed below in conjunction with FIG. 5*d*, illustrating the operation of the RRRS software 161*b*. If a data recorder is installed on the SSCM, the flight data is periodically recorded 537*b* to a removable storage media or on-board memory.

As mentioned, the different modes are not mutually exclusive. FIG. 5*c* illustrates the software flow with both the WiFi direct and the RF modes active. It will be noticed that all of the software tasks from FIGS. 5*a* and 5*b* are represented in FIG. 5*c*. It is further noted that the software flows illustrated in FIGS. 5*b* and 5*c* support the implementation of the radio relay mode. The additional software required for the radio relay mode is shown and discussed in FIG. 5*d*.

FIG. 5*d* illustrates the operation of the RRRS software code 161*b*, 161*c*, and 161*d*. Recall that there are two modes utilizing the RRRS. First are the RF modes (FIGS. 1B, and 1*d*) and second is the radio relay mode (FIGS. 1*c*, 1*d*). The distinguishing characteristic between the two is the wireless connection to a display 150*c*, 150*d*. The RF mode utilizes either a self contained display such as an LCD display 190 or a wired connection to an external display 150*b*, while the radio relay mode utilizes a wireless connection to display the remote ID data. As mentioned, in an exemplary implementation, the wireless connection utilizes WiFi, and the wireless connection is to a WiFi enabled device 150*c*, 150*d* (e.g. smartphone), whereas the wired connection is to a serially enabled device. Both modes will be addressed in FIG. 5*d*. Again, it is noted that these modes are all compatible and may be implemented simultaneously or in any combination. For simplicity, the use of hardware reference numerals, during discussion of RRRS software, will be focused on FIG. 1*d*, which illustrates all operating modes, with the understanding that the discussion applies equally to implementations shown in FIGS. 1*a*-1*c* as applicable.

Once the RRRS 180*d* is powered on 560, it establishes the wireless radio relay network (155*d* FIG. 1*d*) as well as wired connections (156 FIG. 1*d*) to communicate with clients 565. (Once again note that a full-up system incorporating all three communication modes is being discussed for completeness) Note that the SSCM 100*d* is designed to support multiple RRRS devices (see FIG. 3*b*). Also a given RRRS may support multiple devices, some of which might be connected wirelessly and others with a wired connection (see FIGS. 3*a*-3*c*). Note that when the term 'wired' is used, it is intended to broadly refer to a physical connection between the RRRS and the display device, not that there necessarily is a 'wire' connecting the two (see FIG. 3*c*). At any point after the wireless network has been established, wireless clients may connect 567 with the RRRS network 565. The RRRS 180*d* then moves to a listen mode 570 where it is listening for UAS remote ID data from the SSCM 100*d* transmitted on the long range V/UHF LoRa® communication network (199*b* FIG. 1*d*). If UAS data is present 580, it is received 581 by the RRRS receiver (157*d* FIG. 1*d*) and then parsed into its constituent components where it is placed into data packets 582 for transmission 583 to wireless clients ('radio relay') 571 and/or to wired displays ('RF Direct') 569. Display of the remote ID data on the wired (190, 150*b*) or wireless (150*d*) displays is in accordance with that described above in connection with FIGS. 4*a*-4*h*.

Included in the data from the SSCM 100*d* are any alerts or system status messages 584 as discussed above. The alert messages may be part of the parsed data and are included in the wired or wireless transmission to displays. In addition to alert and status messages received from the SSCM, the RRRS software 161*d* independently monitors system performance and may independently generate alerts 590 for display. For example, the RRRS will monitor the RF connection to the SSCM and provide an alert should there be a lack of communication from the SSCM 595.

Figure 6A:
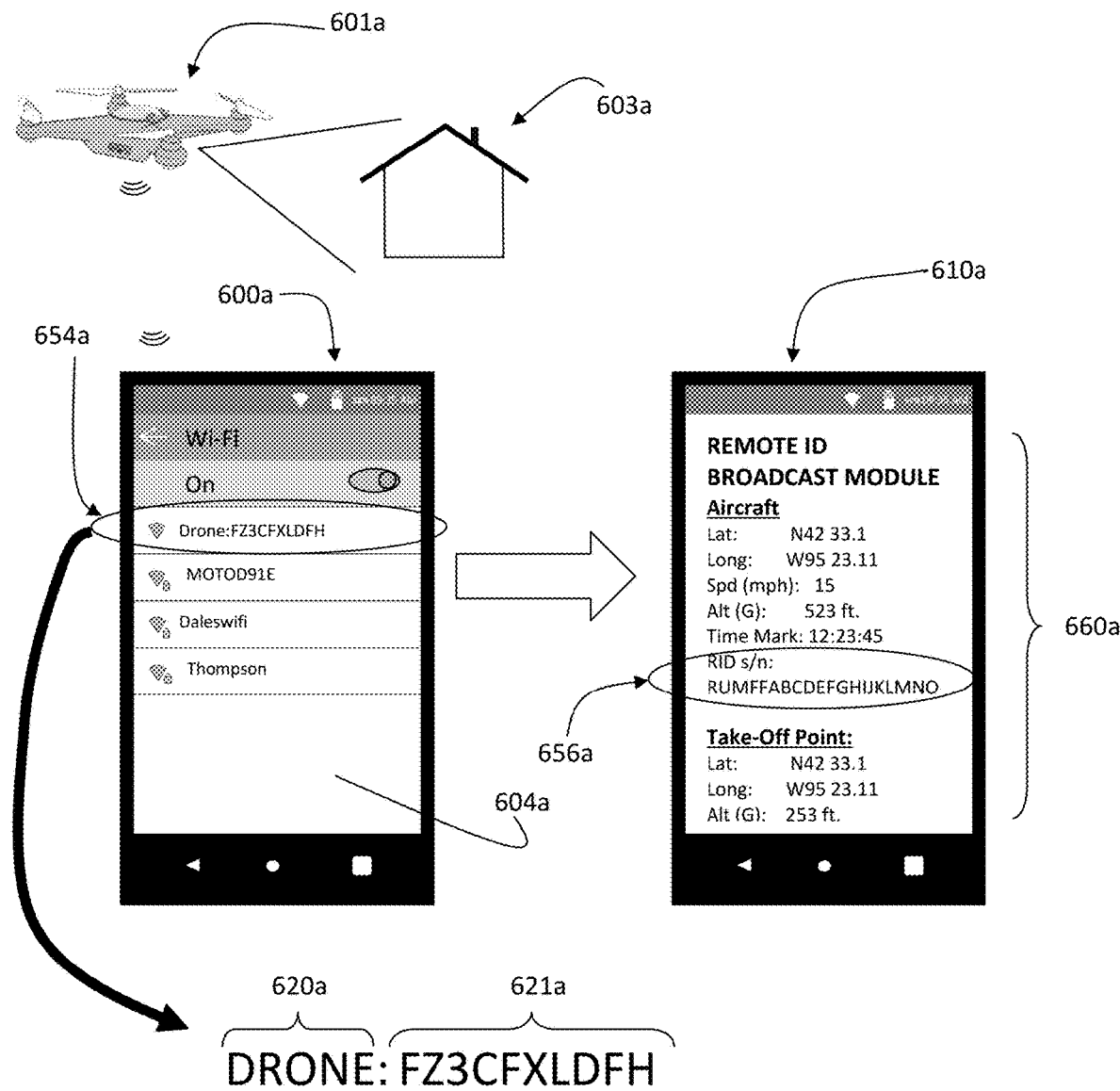
FIGS. 6a-6c illustrate various implementations of the UAS WiFi 'license plate' concept of the invention.
Figure 6B:
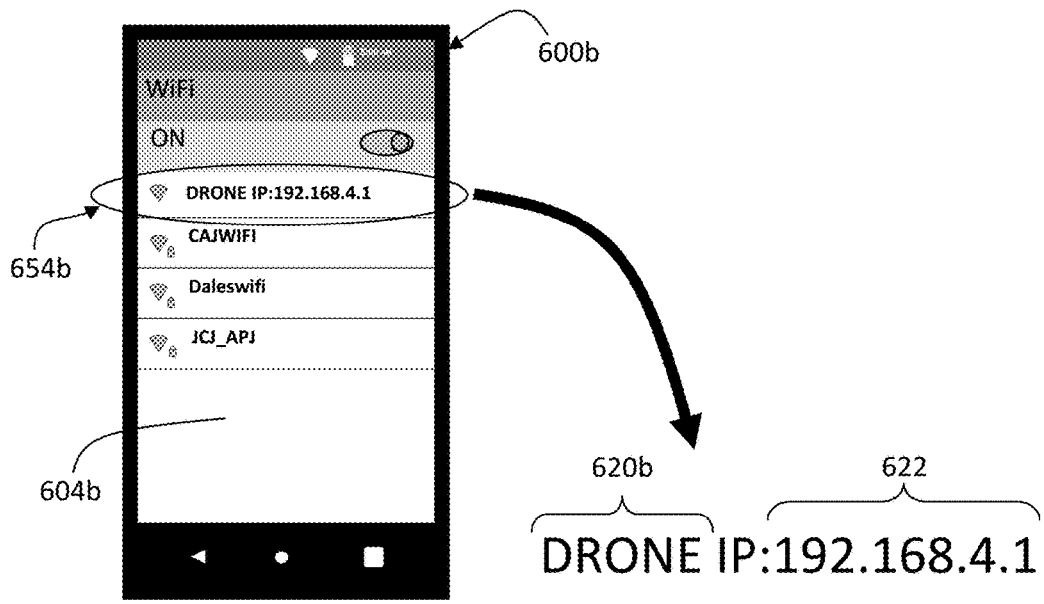
Figure 6C:
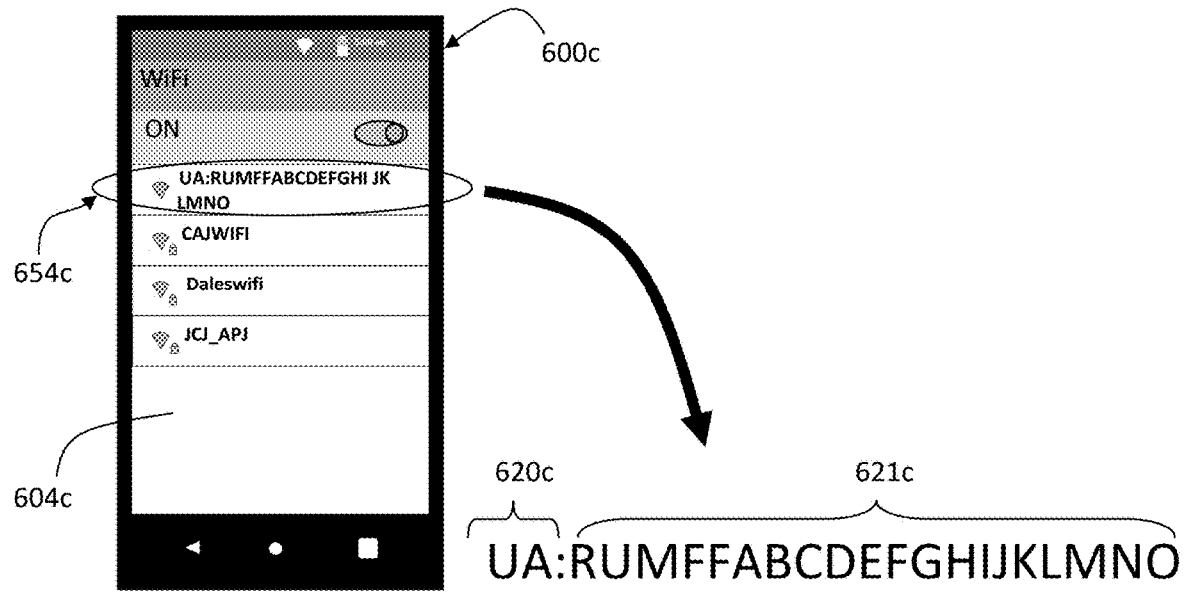

FIGS. 6*a*-*c* illustrate the 'WiFi license plate' feature of the invention by using the UAS remote ID broadcast module registration serial number, or some other identifying data such as the UAS FAA registration ('tail number'), or network connection information, as a part of the broadcast module's WiFi SSID. In wireless networking, the service set identifier (SSID) identifies a group of network devices; most commonly, it is seen as the name of the network to which a device might connect. In an exemplary embodiment of the present invention, it is generated by the SSCM or RRRS (i.e. the servers). In an exemplary embodiment, the SSID is used in part to convey the identification of the network as belonging to a drone/UAS, and to provide the Internet Protocol (IP) address enabling a client to connect to the network server (i.e. SSCM). Remaining characters in the SSID may be used to provide all or part of the drone registration.

As indicated in the IEEE 802.11 WiFi standard, every WiFi transmitter (network) emits a Service Set Identifier (SSID) which is used to identify the device/network. These SSIDs are typically listed on a 'set-up' or 'WiFi' page of a WiFi enabled receiver (600*a* FIG. 6*a*), generally accessed through the 'settings' function. Generally, if the UAS is close enough to be seen/heard, it is close enough to be in WiFi range and thus have its SSID visible. In fact, during testing it was noted the SSID was visible at a distance greater than the client could connect to, and download data from, the network itself.) The 802.11 standard specifies that an SSID can be 32 characters in length and is customizable. Since nearly everyone has a WiFi enabled receiver (a.k.a. smartphone) in their back pocket, it is an easy matter to access the smart phone's WiFi 'set-up page' to view in-rage WiFi SSIDs. As mentioned above, due to the limited range of WiFi, it is likely only one UAS would be within WiFi range at any given time and thus only one would be displayed on the set-up page. Thus, what might be considered a limitation (range) might also be a benefit in that irrelevant UAS WiFi SSIDs are naturally filtered out leaving the UAS SSID of interest, visible. Consequently, the SSID WiFi license plate gives the public access to something that would allow them to identify the UAS even without 'logging on' to the UAS' WiFi network. (Note that for remote ID purposes, the remote ID network would be 'open' so that the public could access it, but the SSID is observable even if the network itself is secured)

Since the SSID is customizable by the network administrator (i.e. the broadcast module manufacturer can program it into the module), the remote ID broadcast module manufacturer can define it to include the module's identification badge (i.e. broadcast module serial number, the UA's FAA registration number ('tail number'), connection information, or some combination). Current standards call for a maximum 20 character broadcast module serial number and 10 characters for FAA registrations. Thus, there is sufficient room to fit the broadcast module's identification badge within the IEEE 802.11 standard for SSIDs. In one exemplary embodiment, the SSCM WiFi transmitter broadcasts this identification badge as part of its SSID, thus providing a 'license plate' visible to anyone with a WiFi enabled device. In still a further embodiment, the SSCM WiFi transmitter broadcasts both the FAA registration and the uniform resource locator (URL) or internet protocol (IP) address of the module to facilitate 'logon.'

As one illustrative example seen in FIG. 6a, a UAS may be on an aerial photography mission in support of a real estate listing. A neighbor seeing the UAS 601a flying around the house 603a might be concerned that some nefarious activity was a foot. By turning on his smartphone 600a and navigating to the WiFi setup page 604a, he might observe that a drone license plate is displayed in the form of a WiFi SSID 654a. In the embodiment of FIG. 6a, the identification badge (license plate) might display the UAS' FAA registration ('tail number') 621a preceded with the word 'Drone' 620a to clearly identify the network as associated with the unmanned aircraft. By displaying the license plate, the UAS would demonstrate that it is not trying to 'hide' from the public. In the event that something raises the neighbor's apprehension, the neighbor could report the FAA registration (SSID) to the authorities. Of course, the public or authorities could also 'log-on' to the UAS network and display the UAS' remote ID page 610a consisting of the complete remote ID data 660a, including the module serial number 656a. However, having available the FAA registration number as displayed in the SSID might be all that is necessary.

In another exemplary embodiment (FIG. 6b), the identification of the network 654b is shown as being associated with a drone 620b and the internet protocol (IP) address 622 of the SSCM/server. Recall that in an exemplary embodiment, the SSCM functions as the network server for the remote ID network. An identifier 620b, in this case 'DRONE,' might be used to identify that the network is that associated with an unmanned aircraft. The IP address is the numerical address used by the network server. By providing the IP or URL associated with the broadcast module as part of the network SSID, sufficient information is conveyed to enable a log-on to the UAS' network and access the RID data for display, including the UAS' identifying remote ID serial number 656a.

In yet another alternative embodiment (FIG. 6c), the SSID 654c, might contain the UAS broadcast module serial number 621c. As above, the broadcast module serial number 621c could be preceded by the 'UA' prefix 620c, indicating the SSID belongs to an unmanned aircraft (UA). The broadcast module serial number 621c and UAS descriptor might be separated using colons as delimiters.

FIG. 7 illustrates some geometrical parameters relevant to the invention. The pilot is required by explicit and implicit rules to keep the UAS within the smaller of visual line of sight (VLOS) and the range of the remote ID broadcast (he has an obligation under the rules to monitor proper functioning of the RID system). To prevent the RID limitation from being the dominant operational restriction, the range of the RID broadcast module must be at least similar to that of the VLOS range. VLOS range is, of course, a function of many variables, UAS size, atmospheric conditions and pilot visual acuity are a few of the more relevant. Operational considerations also play a part. For example, the distance to which a UAS may be flown while maintaining a continuous visual lock is much greater that the distance a pilot is able to visually reacquire that same UAS after looking away. Most people have observed this if they have ever watched a commercial airliner depart. If you follow it continuously for several miles, then look away and look back, it may be very difficult to reacquire. Unless the pilot has a dedicated visual observer, it is inevitable that he will look away from the UAS to perform other mission tasks. Additionally, UAS flight frequently involves associated tasks such as photography or visual inspection using a first person view (FPV) camera. Thus, for many reasons, continuous visual surveillance of the UAS cannot be assumed when computing a VLOS distance. Depth perception also plays a role in determining practical VLOS distance. Depth perception diminishes greatly as the distance increases.

The control range 705 of the unmanned aircraft 700 is generally considerably larger that the pilot's visual limiting distance 710. The distance of most relevance in assessing broadcast mode capabilities is the range at which a member of the public can see or hear the UA. This might be referred to as the zone of awareness, that is to say, the zone within which a member of the public might be expected to be triggered into reporting the UAS to authorities. After all, if the UAS can't be seen or heard, it won't be noticed and reported. This member of the public JQP 760 will be visually acquiring the UAS for the first time, so his visual range to the target is considerably smaller than the theoretical limit as discussed above. The zone within which the UAS may be visually acquired 715 is probably larger than that at which it may be audibly acquired 720, but it is more likely the audio which will be first noticed. This distance will vary from UAS to UAS, but it is probably safe to say it is on the order of a football field or less, especially if outdoors with natural ambient noise. The distance within which a typically sized UAS may be reliably visually acquired de novo, has been estimated in the 3-500 foot range depending on many many factors. These distances place the UAS well within the range of unobstructed WiFi signals. Especially with respect to the WiFi SSID signal, as it has been observed during testing, that the SSID may be 'seen' at a distance greater than that at which a client can log onto the network and receive data.

As mentioned above, the limited range of WiFi may actually have a beneficial effect in that it serves as a natural filter of UAS aircraft. By limiting transmission range, a smaller number, perhaps just one, UAS 700 network SSID, would be within range of an observer's WiFi receiver (i.e. smartphone) at any given time, and that observable SSID would, of course, be the UAS most obvious and proximate to the observer. A nearby, albeit out of range, UAS 701, would not have its SSID visible on the observer's 760 WiFi receiver (i.e. smartphone). Thus, the limited range of the WiFi module essentially filters out all but the most relevant UAS.

Though not drawn completely to scale, the RF direct range 730 is considerably greater than the WiFi direct range 740, so both it and the WiFi relay signal 770, which is leveraged off the RF direct signal 730, can reach users who are a much greater distance from the drone than those relying on WiFi direct. Utilizing the RF direct+WiFi relay signal, the pilot would be able to monitor the UAS at a range greater than the WiFi direct signal would permit, up to the extent he can still maintain VLOS on the drone.

What is claimed is:

1. A multi-mode remote identification (RID) system for unmanned aircraft systems (UAS), the remote identification system operative to sense UAS RID flight data and communicate the sensed RID flight data to a first remote receiver/display device having a display area for displaying the received UAS RID flight data, the remote identification system comprising:

a sensor suite/communication module (SSCM) removably attached to the UAS, the SSCM having,
one or more sensors for sensing UAS RID flight data,
a first communication module for communicating the sensed UAS RID flight data to the first remote receiver/display using a first communication protocol,
a processor in communication with the one or more sensors and first communication module, the processor periodically sampling UAS RID flight data from the one or more sensors to obtain sensed UAS RID flight data and communicating the sensed UAS RID flight data to the first communication module, for transmission to the first remote receiver/display and,
a non-transitory storage medium for storing computer software instructions executable by the processor, the execution of which causes the SSCM to perform its RID flight data sensing and communication functions such that,
upon the periodic sampling of the one or more sensors, the computer software instructions executed by the processor constructs a data packet comprising the sensed UAS RID flight data and communicates the sensed UAS RID flight data packet to the first communication module whereupon the first communication module transmits the sensed UAS RID flight data packet to the first remote receiver/display device using the first communication protocol, and further
wherein the first remote receiver/display device is a WiFi enabled device and wherein the SSCM first communication module is a WiFi enabled transmitter and wherein the first communication protocol comprises a WiFi wireless networking protocol to communicate the sensed UAS flight data to the WiFi enabled first remote receiver/display, and wherein the communication path from the SSCM to the first remote receiver/display is referred to as 'WiFi direct' mode, and
wherein the SSCM further comprises a second communication module utilizing V/UHF RF communication module and wherein the remote ID system further comprises a remote receiver relay system (RRRS) for receiving the UAS RID data and displaying it on second WiFi enabled remote receiver/display, the RRRS having,
a V/UHF RF downlink receiver compatible with the SSCM second communication module,
a WiFi radio relay module,
a processor in communication with the RRRS downlink receiver and with the WiFi radio relay module such that sensed UAS RID flight data is transmitted by the SSCM second communication module to the RRRS V/UHF downlink receiver where it is received and processed by the RRRS processor and forwarded to the WiFi radio relay module where it is relayed to the WiFi enabled second remote receiver/display for display of the UAS RID data, and wherein the communication path from the RRRS to the second remote receiver/display is referred to as 'WiFi relay' mode.

2. The system of claim 1 wherein the SSCM second communication module and RRRS V/UHF RF downlink receiver are both LoRa compatible and utilize the LoRa radio modulation for the transmission of the UAS RID data from the SSCM to the RRRS and further wherein the WiFi communication between the SSCM first communication module and the WiFi enabled first remote receiver/display and WiFi communication between the RRRS WiFi radio relay module and the WiFi enabled second remote receiver/display each utilize a client/server networking protocol with the SSCM first communication module and RRRS WiFi radio relay module functioning as servers on their respective networks, and the WiFi enabled first and second remote receiver/displays functioning as respective clients thereof.

3. The system of claim 2 wherein the SSCM first communication module and RRRS WiFi radio relay module perform as network servers on first and second WiFi networks respectively, and wherein the Server Sent Events network communication protocol is used to effect communication of periodic UAS RID updates from the network servers to network clients on the respective first and second WiFi networks.

4. The system of claim 1 wherein the SSCM first communication module and SSCM processor module and the RRRS WiFi radio relay module and RRRS processor module are integrated System on a Chip WiFi modules.

5. A configurable multi-mode remote identification (RID) system for unmanned aircraft systems (UAS), the remote identification system operative to sense UAS flight data while the UAS is in flight and communicate the sensed flight data to one or more display modules for displaying the received UAS flight data, the remote identification system comprising:
a sensor suite/communication module (SSCM) removably attached to the UAS, the SSCM having,
one or more sensors for sensing UAS RID flight data,
a first communication module for communicating the sensed UAS RID flight data, the first communication module communicating using V/UHF RF,
a processor in communication with the one or more sensors and first communication module, the processor periodically sampling UAS RID flight data from the one or more sensors to obtain sensed UAS RID flight data, constructing a data packet comprising the sensed UAS RID flight data, and communicating the sensed UAS RID flight data packet to the first communication module, for transmission, and
a non-transitory storage medium for storing computer software instructions executable by the processor, the execution of which causes the SSCM to perform its RID flight data sensing and communication functions, and
a remote receiver/relay system (RRRS) having,
a V/UHF RF downlink receiver compatible with the SSCM first communication module,
a processor in communication with the RRRS downlink receiver and with the display module, and wherein the communication path from the SSCM to the RRRS is referred to as 'RF direct' mode, and
a non-transitory storage medium for storing computer software instructions executable by the RRRS processor, the execution of which causing the sensed UAS RID flight data packet transmitted by the SSCM first communication module to the RRRS V/UHF downlink receiver to be received and processed by the RRRS processor and forwarded to the display module for display of the UAS RID data, and
wherein the SSCM first communication module and the RRRS V/UHF RF downlink receiver are LoRa compatible and the communication of the UAS RID data from the SSCM to the RRRS utilizes LoRa modulation.

6. The system of claim 5 wherein the RRRS further comprises a WiFi radio relay module, and a processor in communication with the RRRS downlink receiver and with the WiFi radio relay module such that sensed UAS RID flight data is transmitted by the SSCM first communication module to the RRRS V/UHF downlink receiver where it is received and processed by the RRRS processor and forwarded to the WiFi radio relay module where it is relayed to the WiFi enabled second remote receiver/display for display of the UAS RID data, and wherein the communication path from the RRRS to the WiFi enabled second remote receiver/display is referred to as 'WiFi relay' mode, and wherein the SSCM further comprises a second communication module for communicating the sensed UAS RID data to a first remote receiver/display, the SSCM second communication module utilizing the WiFi communication protocol, the first remote receiver/display being a WiFi enabled device such that UAS RID data sensed by the SSCM is communicated to the first remote receiver/display via WiFi communication and wherein the communication path from the SSCM to the first remote receiver/display is referred to as 'WiFi direct' mode and wherein the SSCM first communication module and the RRRS V/UHF RF downlink receiver are LoRa compatible and the communication of the UAS RID data from the SSCM to the RRRS utilizes LoRa modulation.

7. A method of acquiring and communicating remote identification (RID) flight data from an unmanned aircraft system (UAS) to one or more wireless remote receiver/displays comprising the steps of:
providing a remote identification system operative to sense UAS RID flight data while the UAS is in flight and communicate the sensed RID flight data to a first remote receiver/display having a display area for displaying the received UAS RID flight data, the remote identification system having:
a sensor suite/communication module (SSCM) removably attached to a UAS, the SSCM having,
one or more sensors for sensing RID flight data of the UAS when in flight, the one or more sensors including at least one Global Positioning System (GPS) sensor,
a first wireless communication module for communicating the sensed UAS RID flight data to a first wireless remote receiver/display,
a processor in communication with the SSCM and communication module, the processor receiving the sensed UAS RID flight data from the SSCM and communicating the sensed UAS RID flight data to the communication module, and
a non-transitory computer readable storage medium comprising computer code for acquiring and communicating remote identification (RID) flight data from an unmanned aircraft system (UAS), the computer code comprising instructions executable by the processor, the execution of which causing the SSCM to perform its flight data sensing and communication functions,
performing initialization of the SSCM including, initializing the GPS sensor, and performing a self-test,
acquiring UAS RID data from the one or more sensors and constructing a data packet comprised thereof, the UAS RID data packet being sent by the SSCM processor to the SSCM wireless communication module for wireless communication to remote receiver/displays,
establishing a wireless network allowing wireless interfacing of the receiver/display device to the SSCM,
connecting the remote receiver/display to the SSCM wireless network whereby UAS RID data sensed by the SSCM is received and displayed on the remote receiver/display via the wireless connection network between the SSCM and the establishing a wireless network allowing the wirelessly interfacing the receiver/display device to the SSCM,
generating alert messages based on the occurrence of alerting conditions,
communicating generated alert messages to the remote receiver/display for display, and wherein
the first remote receiver/display is a WiFi enabled device capable of connecting to a WiFi network and receiving data from a server and wherein the step of providing an SSCM first wireless communication module further includes:
providing an SSCM first wireless communication module utilizing the WiFi communication protocol to communicate the sensed UAS flight data to the WiFi enabled first remote receiver, thereby defining a 'WiFi direct' mode,
and wherein the step of establishing a wireless network includes,
the SSCM first wireless WiFi communication module functioning as a 'soft' access point network server,
and wherein the step of connecting the remote receiver/display to the SSCM wireless network includes,
connecting the remote receiver/display to the SSCM access point as a client, the client receiving continuous automatic updates of UAS RID data transmitted by the SSCM WiFi server to the first remote receiver/display client over the wireless network.

8. The method of claim 7 wherein the UAS RID data is further displayed on a WiFi enabled second remote receiver/display the SSCM further comprising:
a second wireless V/UHF RF communication module in communication with the SSCM processor for receiving sensed UAS RID data and for communicating the RID data,
and wherein the remote identification system further comprises:
a remote receiver/relay system (RRRS) for receiving the UAS flight data communicated by the SSCM second V/UHF RF wireless communication module, the remote receiver/relay system including,
a V/UHF RF downlink receiver compatible with the SSCM second wireless V/UHF RF communication module,
a WiFi radio relay module,
a processor in communication with the RRRS downlink receiver and with the WiFi radio relay module such that sensed UAS RID flight data is transmitted by the SSCM second V/UHF RF communication module to the RRRS V/UHF downlink receiver where it is received and processed by the RRRS processor and forwarded to the WiFi radio relay module where it is relayed to the WiFi enabled second remote receiver/display for display of the UAS RID data, and wherein the communication path from the RRRS to the second remote receiver/display is referred to as 'WiFi relay' mode,
the method further including the steps of,
establishing a V/UHF RF connection between the remote receiver/relay system and the SSCM,
transmitting the UAS RID data by the SSCM second V/UHF RF wireless communication module,
receiving the transmitted UAS RID data by the RRRS V/UHF RF downlink receiver via the V/UHF RF connection, establishing a wireless WiFi network between the RRRS WiFi radio relay module and the second remote receiver/display, the RRRS processor, receiving and processing the UAS RID data received by the RRRS V/UHF RF downlink receiver, and forwarding the UAS RID data to the WiFi radio relay module where it is relayed via the wireless WiFi network to the WiFi enabled second remote receiver/display for display of the UAS RID data.

9. The method of claim 8 wherein the SSCM second V/UHF RF wireless communication module and the RRRS V/UHF RF downlink receiver utilize the LoRa communication protocol and wherein the step of transmitting and receiving the UAS RID data from the SSCM to the RRRS is accomplished using a LoRa modulated signal.

10. The method of claim 9 wherein the WiFi communication between the SSCM first communication module and the WiFi enabled first remote receiver/display and the WiFi communication between the RRRS WiFi radio relay module and the WiFi enabled second remote receiver/display utilizes a client/server networking protocol with the SSCM first communication module and RRRS WiFi radio relay module functioning as servers and the WiFi enabled first and second remote receiver/displays functioning as respective clients thereof, and wherein the steps of establishing a wireless network between the SSCM first wireless WiFi communication module and the first remote receiver/display and between the RRRS WiFi radio relay module and the second remote receiver/display includes, establishing first and second wireless networks, the SSCM first communication module and RRRS WiFi radio relay modules functioning as a 'soft' access point network servers on the first and second networks respectively, connecting the first and second remote receiver/displays as clients to the first and second wireless networks respectively, by accessing the first and second network Service Set Identifiers (SSIDs) respectively, and accessing the internet protocol addresses of the respective network whereby each client receives continuous automatic updates of UAS RID data transmitted by the SSCM and RRRS WiFi servers to the first and second remote receiver/display clients over the first and second wireless networks respectively using the server sent events networking protocol.

* * * * *